(12) United States Patent
Mukherjee et al.

(10) Patent No.: US 11,315,337 B2
(45) Date of Patent: Apr. 26, 2022

(54) METHOD AND APPARATUS FOR MANAGING CONTENT IN AUGMENTED REALITY SYSTEM

(71) Applicant: Samsung Electronics Co., Ltd., Suwon-si (KR)

(72) Inventors: Debayan Mukherjee, Bangalore (IN); Swadha Jaiswal, Bangalore (IN); Saumitri Choudhury, Bangalore (IN); Preksha Shukla, Bangalore (IN); Veethika Mishra, Bangalore (IN); Shivi Pal, Bangalore (IN); Suresh Kumar Gara, Bangalore (IN); Nitish Gupta, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/420,783

(22) Filed: May 23, 2019

(65) Prior Publication Data

US 2019/0362563 A1 Nov. 28, 2019

(30) Foreign Application Priority Data

May 23, 2018 (IN) .............................. 201841019375

(51) Int. Cl.
*G06T 19/20* (2011.01)
*G06T 7/536* (2017.01)
(Continued)

(52) U.S. Cl.
CPC .............. *G06T 19/20* (2013.01); *G06T 7/536* (2017.01); *G06T 15/20* (2013.01); *G06T 19/006* (2013.01)

(58) Field of Classification Search
None
See application file for complete search history.

(56) References Cited

U.S. PATENT DOCUMENTS 8,430,310 B1 * 4/2013 Ho .......................... G06F 21/35
235/382
9,171,384 B2 10/2015 Forutanpour et al.
(Continued)

FOREIGN PATENT DOCUMENTS

KR 10-2016-0088208 A 7/2016
KR 10-1660089 B1 9/2016
(Continued)

OTHER PUBLICATIONS

International Search Report dated Sep. 9, 2019, issued in International Patent Application No. PCT/KR2019/006230.
(Continued)

*Primary Examiner* — Jennifer Mehmood
*Assistant Examiner* — Jed-Justin Imperial
(74) *Attorney, Agent, or Firm* — Jefferson IP Law, LLP

(57) ABSTRACT

A method for managing, by an electronic device, content in an augmented reality (AR) system is provided. The method includes identifying a digital artefact that is used by a first application of an electronic device, executing and displaying an image capturing application to capture images, displaying the digital artefact on a captured image which includes an object of a real world where the digital artefact is displayed on or around the object, and, while the digital artefact is displayed, receiving an user input on at least one of the digital artefact or the object for performing an action associated with the digital artefact.

24 Claims, 71 Drawing Sheets

(51) Int. Cl.
*G06T 15/20* (2011.01)
*G06T 19/00* (2011.01)

(56) References Cited

U.S. PATENT DOCUMENTS

| | | |
|---|---|---|
| 9,530,232 B2 | 12/2016 | Maciocci et al. |
| 9,721,391 B2 | 8/2017 | Monaghan et al. |
| 10,282,882 B2 | 5/2019 | Sumner et al. |
| 2008/0071559 A1 | 3/2008 | Arrasvuori |
| 2009/0102859 A1 | 4/2009 | Athsani et al. |
| 2012/0032977 A1 | 2/2012 | Kim et al. |
| 2012/0038668 A1 | 2/2012 | Kim et al. |
| 2012/0038669 A1 | 2/2012 | Lee et al. |
| 2012/0099000 A1 | 4/2012 | Kim |
| 2012/0242840 A1* | 9/2012 | Nakfour ............... G06K 9/6253 348/207.1 |
| 2012/0249416 A1 | 10/2012 | Maciocci et al. |
| 2014/0100997 A1* | 4/2014 | Mayerle ............ G06Q 30/0643 705/27.2 |
| 2014/0168262 A1 | 6/2014 | Forutanpour et al. |
| 2014/0247283 A1 | 9/2014 | Jo |
| 2014/0267410 A1 | 9/2014 | Fein et al. |
| 2015/0378159 A1* | 12/2015 | Lundberg ............ G02B 27/017 345/8 |
| 2016/0048311 A1* | 2/2016 | Purvis ................... G06F 3/0482 715/746 |
| 2016/0379408 A1 | 12/2016 | Wright et al. |
| 2017/0061694 A1* | 3/2017 | Giraldi .................. G06T 19/006 |
| 2017/0200313 A1 | 7/2017 | Lee et al. |
| 2017/0200314 A1 | 7/2017 | Jeong |
| 2018/0025340 A1* | 1/2018 | Schlosser ............. G06Q 20/227 705/24 |
| 2018/0137386 A1 | 5/2018 | Cohen et al. |
| 2018/0205963 A1* | 7/2018 | Matei ................... H04N 21/816 |
| 2019/0088030 A1* | 3/2019 | Masterson ............. G06T 19/20 |
| 2019/0122045 A1* | 4/2019 | Ravi ................... G06K 9/00228 |
| 2020/0202313 A1* | 6/2020 | Eidam .................... G06Q 20/10 |

FOREIGN PATENT DOCUMENTS

| | | |
|---|---|---|
| KR | 10-1672215 B1 | 11/2016 |
| KR | 10-1690311 B1 | 1/2017 |
| KR | 10-1741584 B1 | 5/2017 |
| KR | 10-2017-0082907 A | 7/2017 |
| WO | 2015/192117 A1 | 12/2015 |

OTHER PUBLICATIONS

Extended European Search Report dated Dec. 9, 2020, issued in European Application No. 19807634.1.
Indian Office Action dated May 4, 2021, issued in Indian Patent Application No. 201841019375.

* cited by examiner

METHOD AND APPARATUS FOR MANAGING CONTENT IN AUGMENTED REALITY SYSTEM

CROSS-REFERENCE TO RELATED APPLICATION(S)

This application is based on and claims priority under 35 U.S.C. § 119(a) of an Indian patent application number 201841019375, filed on May 23, 2018, in the Indian Patent Office, the disclosure of which is incorporated by reference herein in its entirety.

BACKGROUND

1. Field

The disclosure relates to an augmented reality (AR) system. More particularly, the disclosure relates to a method and electronic device for managing content in an AR system.

2. Description of Related Art

In general, virtual reality (VR) is a virtual space which is created by an artificial technology using an electronic device (e.g., computer or the like), and VR attempts to mimic reality. In addition, AR is a field related to VR, in which computer graphics technology is used to make an object in AR appear to exist in an original real-world environment by combining a virtual item with an actual environment. An AR application has a feature in which the AR can provide a user with enhanced reality by allowing the user to interact with the virtual item as if in the real world.

Hence, the user recognizes the actual environment where the user is and, at the same time, the user also recognizes virtual information that is displayed on an actual screen in the AR. Since a real image and virtual graphics are combined together and displayed in AR, desired objects have been accurately located at a desired position on a screen so as to obtain a realistic and accurate image. Currently, possibilities of associating the virtual item with physical objects and spaces and vice-versa through AR are limited to only entertainment and gaming scenarios.

Thus, it is desired to address the above mentioned difficulties or shortcomings and to provide a useful alternative.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide are a method and apparatus for managing content in an augmented reality (AR) system.

Additional aspects will be set forth in part in the description which follows and, in part, will be apparent from the description, or may be learned by practice of the presented embodiments.

In accordance with an aspect of the disclosure, a method of managing, by an electronic device, content in an AR system is provided. The method includes detecting a digital artefact on a first application displayed on an electronic device, executing an image capturing application with an image capturing device, projecting the digital artefact to an image including at least one physical object displayed on the image capturing application, and performing an action associated with the digital artefact displayed on the image capturing application.

The method further includes performing at least one action based on the at least one digital artefact displayed on the physical space.

The obtaining of the at least one notification including the at least one digital artefact on the electronic device comprises selecting the at least one digital content from another electronic device, projecting the at least one digital content to a physical space through an image capturing device of the other electronic device, and obtaining the at least one notification including the at least one digital artefact on the electronic device.

The obtaining of the at least one notification including the at least one digital artefact on the electronic device comprises selecting the at least one digital content from an environment in which another electronic device is located, projecting the digital content to a physical space through an image capturing device of the other electronic device, and obtaining the at least one notification including the at least one digital artefact on the electronic device.

The at least one digital content is projected to the physical space through the image capturing device by creating an AR application as an overlay on the physical space.

The obtaining of the at least one notification including the at least one digital artefact on the electronic device includes creating an event comprising at least one digital artefact, projecting the at least one digital content to a user of the electronic device through the image capturing device, and obtaining the at least one notification including the at least one digital artefact on the electronic device.

The obtaining of the at least one notification including the at least one digital artefact on the electronic device comprises creating a document having at least one digital artefact, projecting the document including at least one digital content to an object through an image capturing device, and obtaining the at least one notification including the at least one digital artefact, when the electronic device is in the vicinity of the object.

The obtaining of the at least one notification including the at least one digital artefact on the electronic device includes creating a widget comprising at least one digital artefact, projecting the widget comprising at least one digital content into an object, and obtaining the at least one notification including the at least one digital artefact, when the user of the electronic device is pointing towards the object.

The at least one notification including the at least one digital artefact is obtained when the electronic device is in the vicinity of an AR application.

The AR application is modified, and the modified AR application is projected to the physical space.

The digital artefact includes a geographical position and an orientation of the electronic device along with a model view projection (MVP) matrix of the physical space.

The electronic device is configured to prioritize data, which a user is to be reminded of, on the digital artefact.

In accordance with another aspect of the disclosure, a method of managing content in an AR system is provided. The method includes selecting the at least one digital content from at least one of the electronic device and an environment in which the electronic device is located, projecting the at least one digital content onto a physical space through an image capturing device of the electronic device, and sending at least one notification including the at least one digital artefact to another electronic device.

In accordance with another aspect of the disclosure, a method of managing content in an AR system performed by an electronic device is provided. The method includes creating a data item comprising at least one digital artefact, projecting the at least one digital content to a user of the electronic device through the image capturing device, and obtaining the at least one notification including the at least one digital artefact on the electronic device.

In accordance with another aspect of the disclosure, an electronic device for managing content in an AR system is provided. The electronic device includes an AR content processing engine coupled to a memory and a processor. The AR content processing engine is configured to obtain at least one notification including at least one digital artefact. The AR content processing engine is configured to access the at least one notification through an image capturing device in an AR mode. The AR content processing engine is configured to display the at least one digital artefact on a physical space.

In accordance with another aspect of the disclosure, an electronic device for managing content in an augmented reality system is provided. The electronic device includes an AR content processing engine coupled to a memory and a processor. The AR content processing engine is configured to select the at least one digital content from at least one of the electronic device and an environment in which the electronic device is located. Further, the AR content processing engine is configured to project the at least one digital content to a physical space through an image capturing device of the electronic device. Further, the AR content processing engine is configured to send at least one notification including the at least one digital artefact to another electronic device.

In accordance with another aspect of the disclosure, an electronic device for managing content in an AR system is provided. The electronic device includes an AR content processing engine coupled to a memory and a processor. The AR content processing engine is configured to create a data item comprising at least one digital artefact. Further, the AR content processing engine is configured to display the at least one digital content to a user of the electronic device through the image capturing device. Further, the AR content processing engine is configured to obtain the at least one notification including the at least one digital artefact on the electronic device.

These and other aspects of the disclosure will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
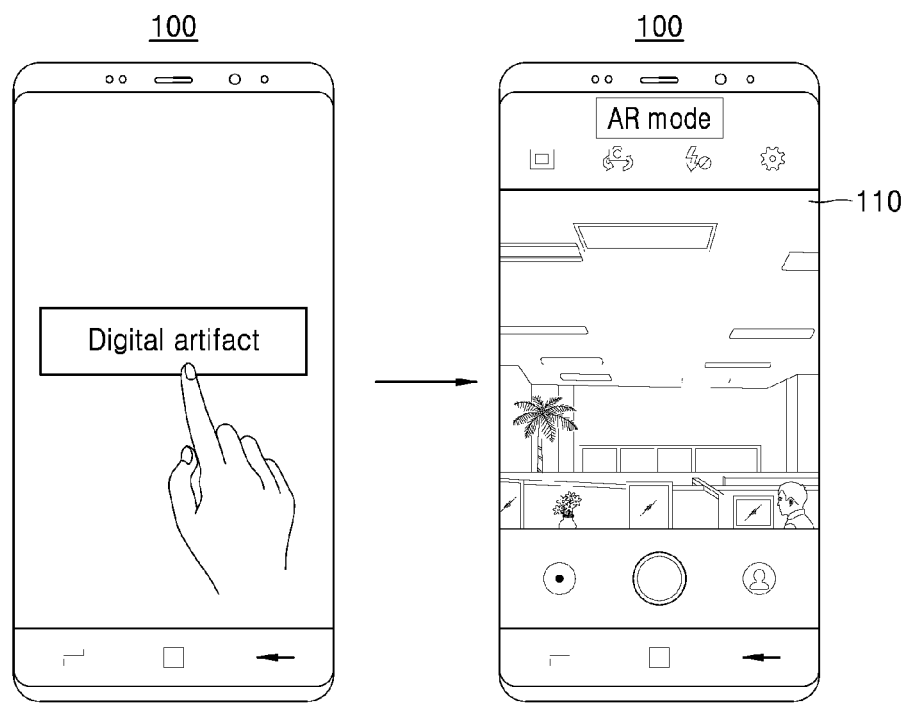
FIG. 1 illustrates an electronic device for managing content in an augmented reality (AR) environment according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein may be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As used herein, the terms "1st" or "first" and "2nd" or "second" may use corresponding components regardless of importance or order and are used to distinguish one component from another without limiting the components.

Accordingly, embodiments herein provide an electronic device and method for managing content in an augmented reality (AR) system. The method, performed by the electronic device, includes obtaining at least one notification including at least one digital artefact, accessing the at least one notification using an image capturing device in an AR mode and controlling display of the at least one digital artefact on a physical space.

Unlike conventional methods and systems, the proposed method can be used to enhance the interaction between a user's digital content, physical objects and spaces that help the user to perform the tasks in a convenient and utilitarian manner.

The method can be used to enhance interaction between the user's environment and the digital content using the image capturing device (e.g., camera, digital camera, or the like), to enhance the sense of intuition that the camera already happens to bring to the user's life.

The method can be used to select the digital content from the electronic device and display the digital content on the physical objects and spaces visible to the camera (i.e. superimpose digital content over a digital representation of the physical objects that captured by the camera). Further, the method can be used to retrieve the digital content on the camera of another electronic device through an AR mode to perform specific tasks or actions (e.g., a voice command by a user, a gesture performed by the user, or the like) based on the user requirement.

The method can be used to select the physical object from the user's environment and display the digital content on the physical objects and spaces visible to the camera. Further, the method can be used to retrieve the digital content from the camera of another electronic device using the AR mode to perform specific tasks based on the user requirement.

The method can be used to select the physical object from the user's environment and display the digital content onto the physical objects and spaces visible to the camera. Further, the method can be used to retrieve the digital content from the camera of the same electronic device using the AR mode to perform specific tasks based on the user requirement.

The method can be used to create a virtual memo on a real-world space or object using AR technology, and grant authority to access the virtual memo to a user (e.g., a desired user, a designated person, or the like).

Referring now to the drawings, and more particularly to FIGS. 1 to 15H, embodiments of the disclosure will be described.

FIG. 1 illustrates an electronic device for managing content in an AR environment according to an embodiment of the disclosure.

Referring to FIG. 1, the electronic device 100 may be, for example, but is not limited to, a smart phone, a personal digital assistant (PDA), a tablet computer, a laptop computer, a personal computer (PC), a virtual reality (VR) headset, a dual screen mobile device, or the like.

The content provided for a scene may include information about businesses within the scene, such as hours of operation, menus and specials for restaurants and bars, sales at grocery and retail stores, upcoming events, and/or customer ratings of the businesses. The content may also include information about the city or neighborhood included in the scene, such as public transportation timetables, public park information, historic sites and events, tourist information, and/or locations of police and emergency services. In addition, the content may include translations of foreign language signs included in the scene. The content may further include identification of people included in the scene, such as whether and how a person is connected to the user via a social networking service (SNS). The content may also include environmental information such as temperature, weather forecasts, and/or pollution and allergen levels. The above list of types of content is merely exemplary and does not provide an exhaustive list of the types of information that may be provided in a scene of an AR application.

When a user accesses an image capturing device 110 of an electronic device 100 in an AR mode, the image capturing device 110 detects an image in a camera preview mode. In an embodiment, the planar surface in the image is detected using a combination of rectangle tracking techniques, finger tracking techniques, and/or eye gaze tracking techniques that utilize input received via the image capturing device 110.

In an example, the image capturing device 110 receives an input of an image of a scene. Subsequently, the image capturing device 110 identifies or detects at least one reference physical object in the image of the scene based on detecting one or more rectangles in the received input. Further, the image capturing device 110 may receive input that defines a surface segment relative to at least one reference object.

In an embodiment, the planar surface is detected based on a surface segment arrangement relative to a current perspective of the scene.

In an embodiment, the planar surface is dynamically determined based on a planar surface segment and determining that the current perspective of the image of the scene has changed.

Further, the image capturing device 110 lists all the detected planar surfaces. Further, the image capturing device 110 calculates respective model view projection (MVP) matrices for the detected planar surfaces. Further, the user may select at least one planar surface where the user would like to drop a digital artefact. Each of the planar surfaces may correspond to each of physical objects displayed on the image of the scene.

Once the user selects the planar surface, the user is prompted to select the type of artefact and enter artefact information. After the user provides the artefact information, the electronic device 100 bundles and collect information regarding an electronic device's real world geographical position and orientation, along with an MVP matrix of the surface selected and artefact information in a file format (e.g., a JavaScript object notation (JSON) file format or the like). The file format may be notified to the user, when the digital artefact is triggered. If the user accesses the notification, the electronic device 100 utilizes the information of the digital artefact or the information included in the digital artefact to display the digital artefact on a display (not shown).

In an embodiment, the electronic device 100 is configured to create a document including at least one digital artefact. The image capturing device 110 is configured to display the document including at least one digital content to an object (e.g., a physical object). Further, the electronic device 100 is configured to obtain the at least one notification including the at least one digital artefact, when the electronic device 100 is in the vicinity of the object. Further, the electronic device 100 is configured to access the at least one notification using the image capturing device 110 in the AR mode. The image capturing device 110 is configured to display the at least one digital artefact on the physical space. Based on the at least one digital artefact displayed on the physical space, the image capturing device 110 is configured to perform at least one action or task. The action or task can be, for example, but is not limited to, a call to another user, sending a message, inquiring about a location, or the like.

In an example, a portable document format (PDF) document is displayed on a house that is in view (e.g., in the distance, as seen from an office) by pointing the camera at the house from the office. On arriving at the house (or in the vicinity of the house), the user is notified to remind him that the user has left something to read at this location, and the PDF document can be retrieved with the AR mode from a space in the house. It may be determined whether the user or the electronic device of the user is in the vicinity of the house based on global positioning system (GPS) information of the electronic device.

In another embodiment, the electronic device 100 is configured to create a widget including at least one digital artefact. Further, the electronic device 100 is configured to display the widget including at least one digital content to the object. Further, the electronic device 100 is configured to obtain the at least one notification including the at least one digital artefact, when the user of the electronic device 100 is pointing towards the object. Further, the electronic device 100 is configured to access the at least one notification using the image capturing device 110 in the AR mode. The image capturing device 110 is configured to display the at least one digital artefact on the physical space. Based on the at least one digital artefact displayed on the physical space, the image capturing device 110 is configured to perform at least one action.

In an embodiment, a weather widget displayed on a user's device displayed on the user's device pointed at the sky. The user receives the weather forecast based on an angle at which the camera of a smart phone is held, whenever the camera is pointed at the sky.

In another example, a video content displayed on a physical space (e.g., computer or a TV) by pointing the camera at the computer or the TV in a living room. When the user returns home and is notified that the video content has been left to watch later in the living room in the AR mode, user can resume watching the video content from a point where it was paused.

In another embodiment, a note with password(s) is displayed on a secret space by pointing the camera over the secret space. Only the user can retrieve the password in the same space by pushing a user interface (UI) that needs the password to be entered at the UI.

In another example, multiple bills or receipts are displayed on a common space by pointing the camera at the common space. The bill amounts get added in the background and various calculations/statistics (e.g., monthly expenditure tracking, money management advice or the like) can be retrieved from the common space by pointing the camera over the common space.

In an embodiment, the at least one digital content is displayed on the physical space by creating an AR application as an overlay on the physical space.

In an embodiment, the at least one notification comprising the at least one digital artefact is obtained when the electronic device 100 is in the vicinity of the AR application. In an embodiment, when the AR application is modified, the modified AR application is displayed on the physical space.

In an embodiment, the digital artefact includes a geographical position and an orientation of the electronic device 100 along with an MVP matrix of the physical space.

In an embodiment, the electronic device 100 is configured to prioritize data, which a user is to be reminded of, on the digital artefact. In an example, if the user receives the multiple notifications related to the digital artefact, the electronic device 100 prioritizes the notification to be indicated on the digital artefact.

Figure 2:
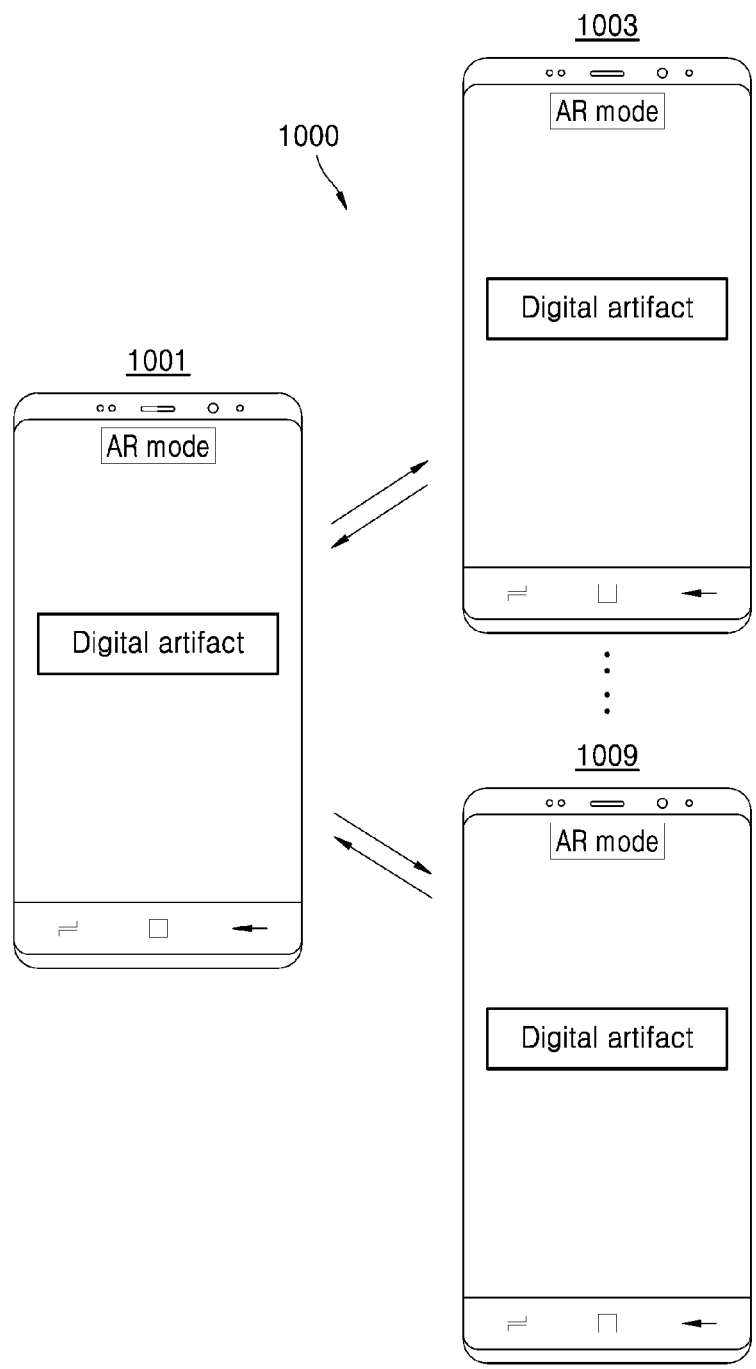
FIG. 2 illustrates an AR system for managing content in an AR environment according to an embodiment of the disclosure.

FIG. 2 illustrates an AR system for managing the content in an AR environment according to an embodiment of the disclosure.

Referring to FIG. 2, the AR system 1000 may include a set of electronic devices 1001, 1003 and 1009 (hereafter, referred to as the electronic device 100, collectively). The functionalities and operations of the electronic device 100 are explained referring to FIG. 1.

The electronic device 1001 may have one or more modules which permit communication such as wireless communication among the electronic devices 1001-1009 with or without a server. The wireless communication among the electronic devices 1001-1009 may include short-range communication including Bluetooth, radio frequency identification (RFID), infrared data association (IrDA), ultra-wide-band (UWB), ZigBee, near field communication (NFC), wireless-fidelity (Wi-Fi), Wi-Fi Direct, wireless universal serial bus (USB), miracast technique, or the like.

When the user accesses the image capturing device of the electronic device 1001 in the AR mode, the image capturing device detects a planar surface in the camera preview mode. Further, the image capturing device lists all the detected planar surfaces. Further, a processor included in the image capturing device calculates the respective MVP matrices for the detected planar surfaces. Further, the user selects the planar surfaces where the user would like to drop the digital artefact.

Once the user selects the planar surface, the user will be prompted to select the type of artefact and input the artefact information. After the user inputs the artefact information, the electronic device 1001 will bundle or collect information regarding the electronic device's real world geographical position and orientation, along with the MVP matrix of the surface selected and artefact information in a file format (e.g., a JSON file format or the like). In an embodiment, the file format is shared with another electronic device 1003.

Further, the electronic device 1003 receives the file format. If the user of the other electronic device 1003 accesses the file format in the form of a notification then, the other electronic device 1003 utilizes the information of the digital artefact to display the digital artefact on the display screen.

In an embodiment, once the other electronic device 1003 receives the artefact information, the artefact information is parsed and a GPS location of the other electronic device 1003 is tracked. In the other electronic device 1003, a tap interaction is performed on the digital artefact visible using the image capturing device of the other electronic device 1003 in the AR mode. Further, the image capturing device of the other electronic device 1003 invokes a relevant application (e.g., a social networking application, a contact application, or the like) for further action (e.g., making a call, sending a message, or the like) in the AR mode.

In another embodiment, the electronic device 1001 including the image capturing device is configured to select at least one digital content. The at least one digital content may include a digital artefact launched on an application displayed on the electronic device 1001. The electronic device 1001 is configured to display the at least one digital content to a physical space using the image capturing device. The physical space may be observed on a screen displayed by an image capturing application executed on the electronic device 1001. Further, another electronic device 1003 is configured to obtain the at least one notification including the at least one digital artefact. The other electronic device 1003 is configured to access the at least one notification using the image capturing device of the other electronic device 1003 in the AR mode. The image capturing device of the other electronic device 1003 is configured to display the at least one digital artefact on the physical space. Based on the at least one digital artefact displayed on the physical space, the image capturing device of the other electronic device 1003 is configured to perform at least one action.

In an example, a note application is displayed on a physical space by pointing the camera at a desk of a colleague. Further, the colleague is notified based on coordinates of the desk/work space that the user has sent a note for the colleague. If the colleague accesses the note, the colleague receives the notification.

In another embodiment, the electronic device 1001 including the image capturing device is configured to select and/or detect at least one digital content from the environment in which the electronic device 1001 is located. The at least one digital content may include a digital artefact launched on an image capturing application. The electronic device 1001 is configured to display the digital content on a physical space using the image capturing device of the electronic device 1001. The physical space may be observed using a screen displayed by an image capturing application of the image capturing device. Further, another electronic device 1003 is configured to obtain the at least one notification including the at least one digital artefact. Further, the other electronic device 1003 is configured to access the at least one notification using the image capturing device of the other electronic device 1003 in the AR mode. The image capturing device of the other electronic device 1003 is configured to display the at least one digital artefact on the physical space. Based on the at least one digital artefact displayed on the physical space, the image capturing device of the other electronic device 1003 is configured to perform at least one action.

In an example, personal contact information (e.g., mother's contact information or the like) is displayed on the physical object (e.g., bedside table or the like) by pointing the camera at the physical object. When the user comes home, the user is notified, when going to bed, to remind him/her to check his/her bedside table, which prompts the user to make an audio call or a video call to his/her mother by pointing the camera at the bedside table.

In another embodiment, the electronic device 100 is configured to create an event (e.g., birthday event or the like) including at least one digital artefact. The image capturing device 110 is configured to display at least one digital content to the user of another electronic device 1003. Further, the other electronic device 1003 is configured to obtain the at least one notification including the at least one digital artefact. Further, the other electronic device 1003 is configured to access the at least one notification using the image capturing device of the other electronic device 1003 in the AR mode. The image capturing device of the other electronic device 1003 is configured to display the at least one digital artefact on a physical space. Based on the at least one digital artefact displayed on the physical space, the image capturing device of the other electronic device 1003 is configured to perform at least one action (e.g., attend the birthday party, send birthday wishes, or the like).

In an embodiment, a calendar event (e.g., a birthday invitation) is created and displayed to a person in view or to a group of people in view (by pointing the camera at him or them) for him or them to receive an invitation to the calendar event.

Figure 3:
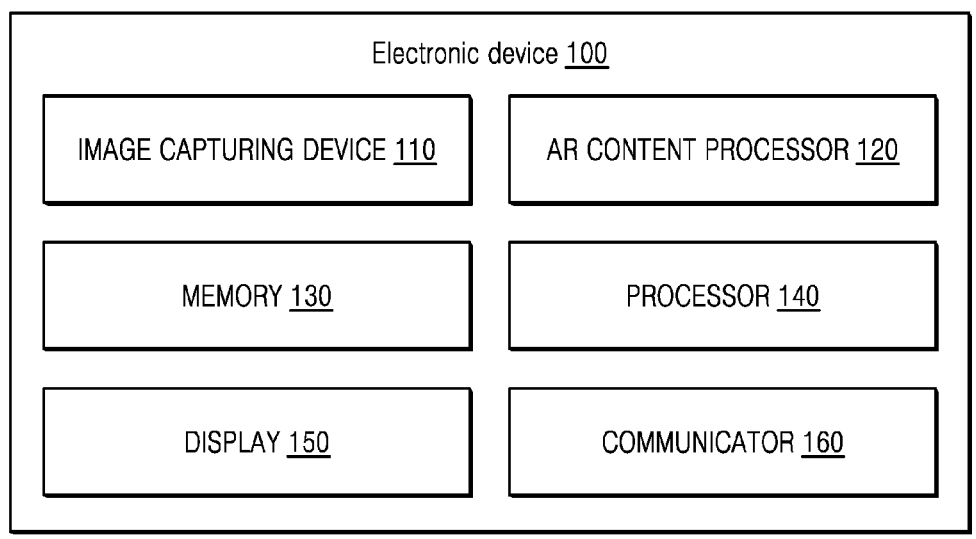
FIG. 3 is a block diagram of an electronic device according to an embodiment of the disclosure.

FIG. 3 is a block diagram of an electronic device according to an embodiment of the disclosure.

Referring to FIG. 3, the electronic device 100 may include the image capturing device 110, an AR content processor 120, a memory 130, a processor 140, a display 150, and a communicator 160. The AR content processor 120 communicates with the image capturing device 110, the memory 130, the processor 140, the display 150, and the communicator 160. The AR content processor 120, the processor 140, and the communicator 160 may be implemented as at least one hardware processor.

When the user accesses the image capturing device 110 in the AR mode, the image capturing device 110 detects a planar surface in the camera preview mode. Further, the image capturing device 110 lists all the detected planar surfaces and the AR content processor 120 calculates respective MVP matrices for the detected planar surfaces. Furthermore, the user selects the planar surfaces of the image where the user would like to drop a digital artefact. In an embodiment, an MVP matrix combines all the transformations into a single 4×4 matrix. The MVP matrix multiplies homogeneous coordinates that describe a three dimensional (3D) model's vertices.

Once the user selects the planar surface, the user will be prompted to select the type of artefact and enter or input artefact information. After the user provides the artefact information, the AR content processor 120 will bundle the electronic device's real world geographical position and orientation, along with the MVP matrix of the surface selected and artefact information in a file format (e.g., a JSON file format or the like). In an embodiment, the file format is notified to the user when the digital artefact is triggered. If the user accesses the notification, the AR content processor 120 utilizes the information of the digital artefact to display the digital artefact on the display 150.

In an embodiment, the AR content processor 120 is configured to create a document including at least one digital artefact. The image capturing device 110 is configured to display the document including at least one digital content to a physical object. Further, the AR content processor 120 is configured to obtain at least one notification including the at least one digital artefact, when the electronic device 100 is in the vicinity of the object. Further, the AR content processor 120 is configured to access the at least one notification using the image capturing device 110 in the AR mode. The display 150 is configured to display the at least one digital artefact on the physical space. Based on the at least one digital artefact displayed on the physical space, the image capturing device 110 is configured to perform at least one action/task. The action/task can be, for example, but is not limited to, making a call, sending a message, inquiring about the location, or the like.

In another embodiment, the AR content processor 120 is configured to create a widget including at least one digital artefact. Further, the AR content processor 120 is configured to display the widget including at least one digital content to the object, obtain at least one notification including the at least one digital artefact, when the user of the electronic device 100 is pointing towards the object, and access the at least one notification using the image capturing device 110 in the AR mode. The display 150 is configured to display the at least one digital artefact on the physical space. Based on the at least one digital artefact displayed on the physical space, the image capturing device 110 is configured to perform at least one action.

In an embodiment, the AR content processor 120 is configured to prioritize data, which a user is to be reminded of, on the digital artefact.

The processor 140 is configured to execute instructions stored in the memory 130 and to perform various processes. The communicator 160 is configured to communicate internally between internal hardware components and with external devices via one or more networks. The communicator 160 is configured to communicate with the AR content processor 120 to manage the content in the AR system 1000.

The memory 130 also stores instructions to be executed by the processor 140. The memory 130 may include non-volatile storage elements. Examples of such non-volatile storage elements may include magnetic hard discs, optical discs, floppy discs, flash memories, or forms of electrically programmable memory (EPROM) or electrically erasable and programmable memory (EEPROM). In addition, the memory 130 may, in some examples, be considered a non-transitory storage medium. However, the term "non-transitory" should not be interpreted as meaning that the memory 130 is non-movable. In some examples, the memory 130 can be configured to store larger amounts of information than the memory. In certain examples, a non-transitory storage medium may store data that can, over time, change (e.g., in random access memory (RAM) or cache memory).

Although FIG. 3 shows various hardware components of the electronic device 100, it is to be understood that other embodiments are not limited thereto. In other embodiments, the electronic device 100 may include more or less components. Further, the labels or names of the components are used only for illustrative purpose and do not limit the scope of the disclosure. One or more components can be combined together to perform the same or substantially similar functions to manage the content in the AR system 1000.

Figure 4:
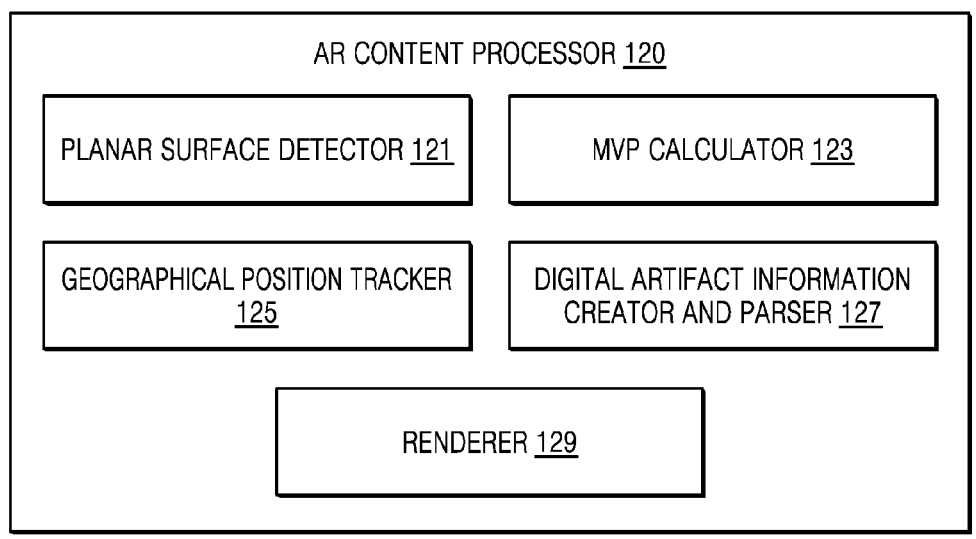
FIG. 4 is a block diagram of an AR content processor of an electronic device according to an embodiment of the disclosure.

FIG. 4 is a block diagram of an AR content processor of an electronic device according to an embodiment of the disclosure.

Referring to FIG. 4, the AR content processor 120 includes a planar surface detector 121, an MVP calculator 123, a geographical position tracker 125, a digital artefact information creator and parser 127, and a renderer 129.

The user of the electronic device 100 accesses the image capturing device 110 in the AR mode. After accessing the image capturing device 110 in the AR mode, the planar surface detector 121 is configured to detect the planar surface in an image capturing device preview mode and the planar surface detector 121 lists all the detected planar surfaces. Further, the MVP calculator 123 calculates respective MVP matrices for the detected planar surfaces.

Further, the user of the electronic device 100 selects the planar surfaces from the detected planar surfaces, where the user of the electronic device 100 would like to drop or plant the digital artefact. Once the user selects the planar surface from the detected planar surfaces, the user of the electronic device 100 will be prompted to select the type of artefact and enter artefact information.

Once the user of the electronic device 100 provides the artefact information, the digital artefact information creator and parser 127 will bundle the electronic device's real world geographical position and orientation, along with an MVP matrix of the surface selected and artefact information in a file format (e.g., a JSON file format or the like). In an embodiment, the file format is pushed to a server (not shown) to be delivered to another electronic device 1003.

In an embodiment, the MVP matrix includes model, view and projection matrices. The MVP is may be required to perform rendering at the first electronic device 1001 and the second electronic device 1003. The model matrix will remain the same at both the electronic device 1001 and the electronic device 1003. Viewing frustrum information for view matrix calculation will remain the same at both the electronic device 1001 and the electronic device 1003.

Further, the electronic device 1001 only sends the model matrix and the viewing frustrum information instead of the entire MVP matrix to the electronic device 1003. A projection matrix will be different at both the electronic device 1001 and the electronic device 1003. The projection matrix is calculated independently at both the electronic device 1001 and the electronic device 1003 as the projection matrix is dependent on the hardware and field of view of the image capturing device 110.

Although the FIG. 4 shows various hardware components of the AR content processor 120, it is to be understood that other embodiments are not limited thereto. In other embodiments, the AR content processor 120 may include more or less components. Further, the labels or names of the components are used only for illustrative purpose and do not limit the scope of the disclosure. One or more components can be combined together to perform the same or substantially similar functions to manage the content in the AR system 1000.

Figure 5A:
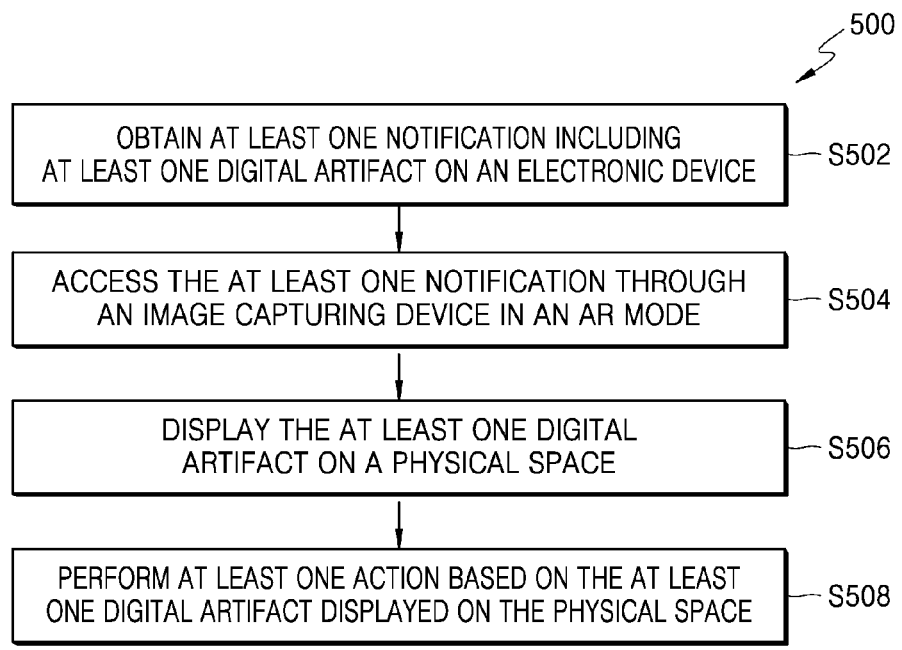
FIG. 5A is a flowchart illustrating a method of managing content in an AR system according to an embodiment of the disclosure.

FIG. 5A is a flowchart illustrating a method of managing content in an AR system 1000 according to an embodiment of the disclosure.

Referring to FIG. 5A, a flowchart illustrates operations to manage content in the AR system 1000. At operation S502, the electronic device 100 obtains at least one notification including at least one digital artefact. In an embodiment, the AR content processor 120 may obtain the at least one notification including at least one digital artefact on the electronic device 100. At operation S504, the at least one notification is accessed using the image capturing device 110 in the AR mode. In an embodiment, the image capturing device 110 may access the at least one notification in the AR mode.

At operation S506, the at least one digital artefact is displayed on the physical space. In an embodiment, the display 150 may display the at least one digital artefact on the physical space. At operation S508, at least one action is performed based on the at least one digital artefact displayed on the physical space. In an embodiment, the AR content processor 120 may perform the at least one action based on the at least one digital artefact displayed on the physical space.

The various actions, acts, blocks, steps, or the like in the flowchart 500 may be performed in the order presented, in a different order, or simultaneously. Further, in some embodiments, some of the actions, acts, blocks, steps, or the like may be omitted, added, modified, skipped, or the like without departing from the scope of the disclosure.

Figure 5B:
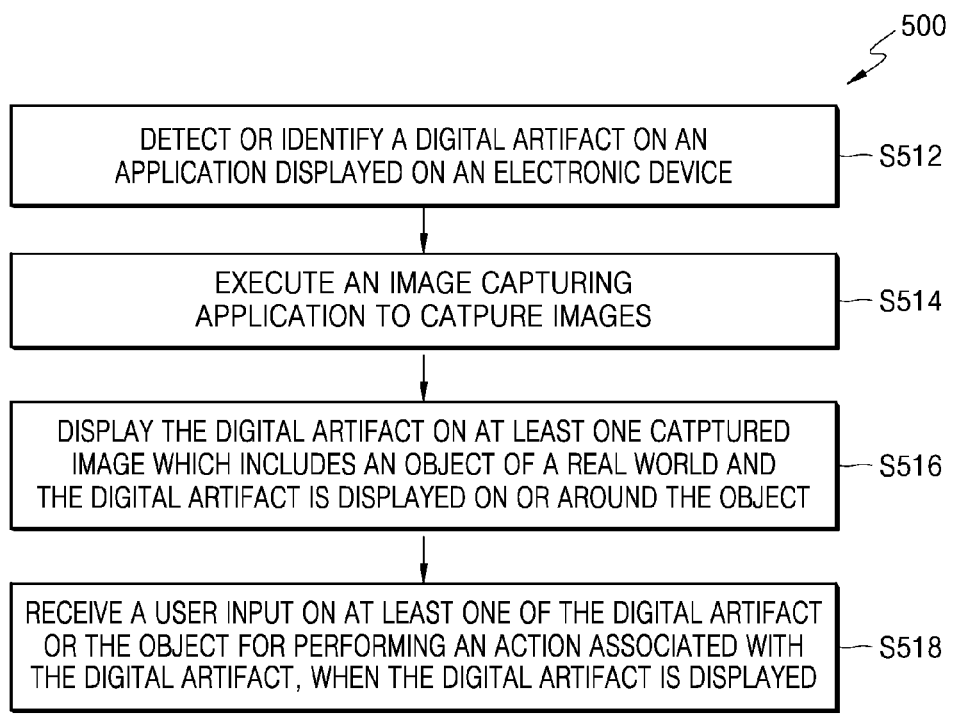
FIG. 5B is a flowchart illustrating a method of managing content in an AR system according to an embodiment of the disclosure.

FIG. 5B is a flowchart illustrating a method of managing content in an AR system 1000 according to an embodiment of the disclosure.

Referring to FIG. 5B, a flowchart 510 illustrates a method of managing content in the AR system 1000. At operation S512 the processor 140 of the electronic device 100 may detect or identify a digital artefact used by an application displayed on the electronic device 100. At operation S514, the processor 140 may execute an image capturing application with an image capturing device 110 to capture images. The image capturing application may be a camera application executable on an electronic device. By launching the image capturing application, the user may observe a physical space on a screen of the display of the electronic device 100.

At operation S516, the processor 140 may display the digital artefact on a captured image which includes at least one object. The digital artefact may be displayed on or around the object. The object may be a physical object of a real world in the physical space. At operation S518, the processor 140 may receive a user input on at least one of the digital artefact or the object for performing an action associated with the digital artefact on the image capturing application while the digital artefact is displayed.

Figure 6A:
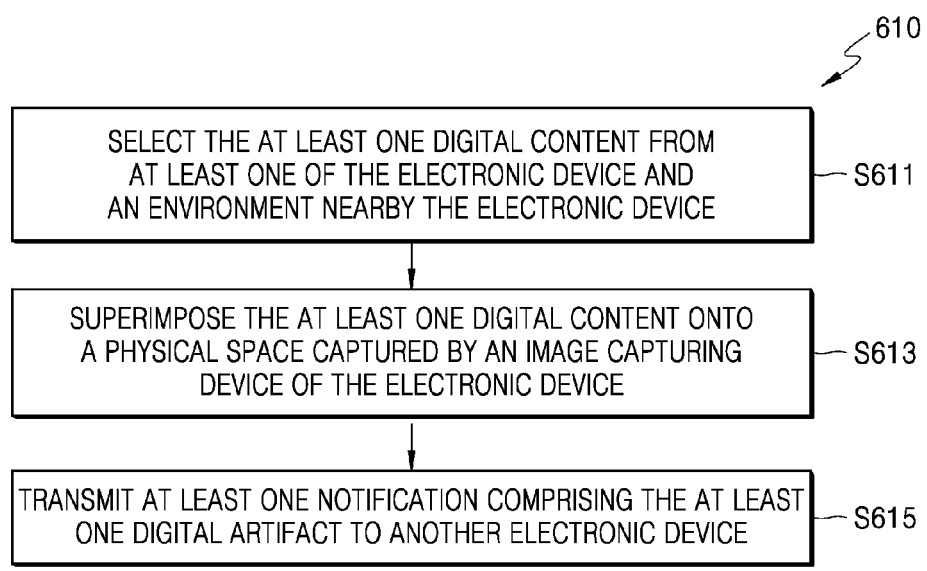
FIG. 6A is a flowchart illustrating a method of managing content in an AR system, when an electronic device sends at least one notification including at least one digital artefact to another electronic device, according to an embodiment of the disclosure.

FIG. 6A is a flowchart illustrating a method of managing content in an AR system 1000, when an electronic device sends at least one notification including at least one digital artefact to another electronic device according to an embodiment of the disclosure.

Referring to FIG. 6A, a flowchart 610 illustrating a method of managing content in an AR system, when an electronic device sends at least one notification including at least one digital artefact to another electronic device. Operations S611 to S615 may be performed by the AR content processor 120. At operation S611, the at least one digital content is selected from at least one of the electronic device 1001 and the environment in which the electronic device 1001 is located. At operation S613, the at least one digital content is displayed on a physical space by the electronic device 1001. At operation S615, at least one notification comprising the at least one digital artefact is sent to the other electronic device 1003 or 1009.

The various actions, acts, blocks, steps, or the like in the flowchart 610 may be performed in the order presented, in a different order, or simultaneously. Further, in some embodiments, some of the actions, acts, blocks, steps, or the like may be omitted, added, modified, skipped, or the like without departing from the scope of the disclosure.

Figure 6B:
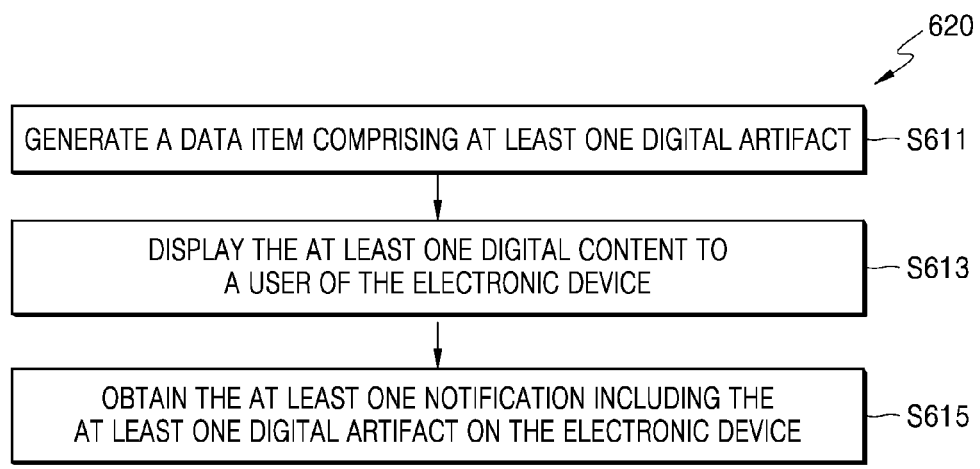
FIG. 6B is a flowchart illustrating a method of managing content in an AR system, when an electronic device reminds a user of at least one notification including at least one digital artefact, according to an embodiment of the disclosure.

FIG. 6B is a flowchart illustrating a method of managing content in an AR system, when an electronic device reminds a user of at least one notification including at least one digital artefact, according to an embodiment of the disclosure.

Referring to FIG. 6B, a flowchart 620 illustrates a method of managing content in an AR system, when an electronic device reminds a user of at least one notification including at least one digital artefact. Operations 621 to 625 may be performed by the AR content processor 120. At operation S621, a data item comprising the at least one digital artefact is generated. The data item can be, for example, but is not limited to, a document, a widget or the like. At operation S623, the at least one digital content is displayed to the user of the AR system 1000 using the image capturing device 110. At operation S625, the at least one notification including the at least one digital artefact on the electronic device 100 is obtained.

The various actions, acts, blocks, steps, or the like in the flowchart 620 may be performed in the order presented, in a different order, or simultaneously. Further, in some embodiments, some of the actions, acts, blocks, steps, or the like may be omitted, added, modified, skipped, or the like without departing from the scope of the disclosure.

FIGS. 7A, 7B, 7C, 7D, 7E, 7F, 7G, and 7H are example illustrations in which a digital artefact is displayed on a physical object according to various embodiments of the disclosure.

Figure 7A:
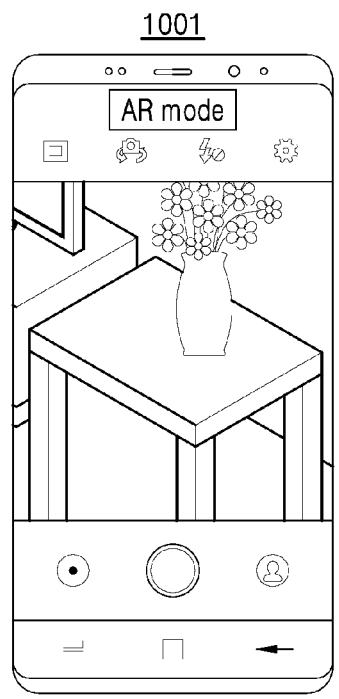
FIGS. 7A, 7B, 7C, 7D, 7E, 7F, 7G, and 7H are example illustrations in which a digital artefact is displayed on a physical object according to various embodiments of the disclosure.
Figure 7B:
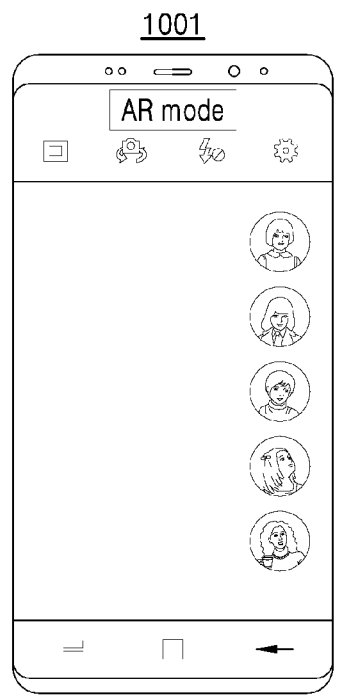

Referring to FIG. 7A and FIG. 7B, when the user of the electronic device 1001 accesses the camera in the AR mode and the camera pulls a set of contacts to display them on a portion of a camera preview screen, the camera detects a planar surface in the camera preview mode and the camera lists all the detected planar surfaces. Further, the MVP calculator 123 calculates respective MVP matrices for the detected planar surfaces. The set of contacts may be displayed along an edge of the camera preview screen in an embodiment. The set of contacts may be displayed on an image capturing application. The user of the electronic device 1001 may select at least one contact among the set of contacts for display on one of the detected planar surface.

Figure 7C:
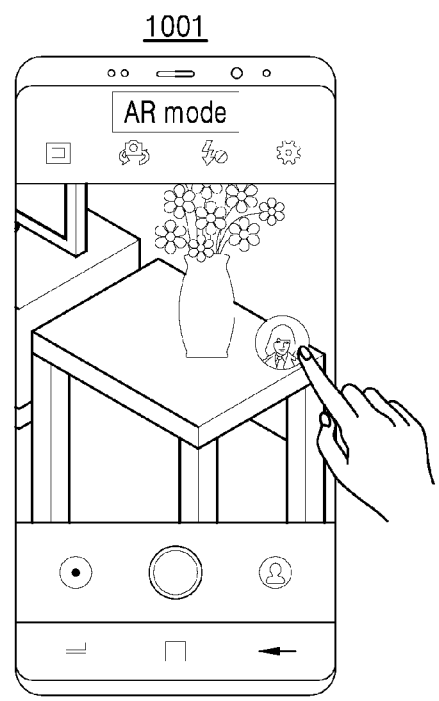
Figure 7D:
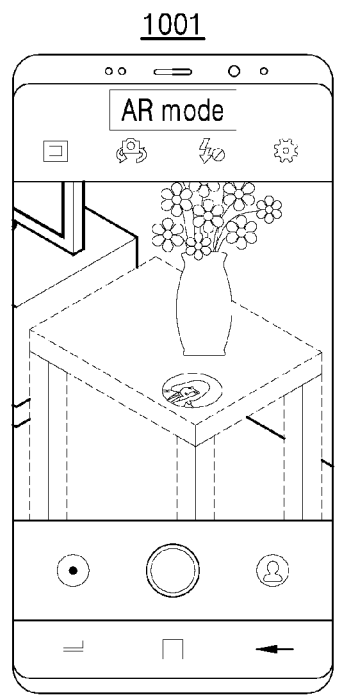

Further, the user of the electronic device 1001 selects the planar surfaces from the detected planar surfaces, where the user of the electronic device 1001 would like to display the digital artefact as shown in FIGS. 7C and 7D.

Once the user selects the planar surface from the detected planar surfaces, the user of the electronic device 1001 displays the contact or the contact information in the form of a digital artefact onto the planar surface and flattens the digital artefact on the planar surface to match the perspective of the physical object (identified by using a 3D map) as shown in FIGS. 7C and 7D.

Further, the contact information is shared in an online mode, so as to reflect the contact's status update in a regular time interval. The contact's status update is seen differently from one person to another person. The information is profiled and seen contextually by each member through their respective cameras.

The digital artefact includes the electronic device's real world geographical position and orientation, along with the MVP matrix of the selected planar surface and the artefact information in a JSON file. The JSON file is transferred to the servers (not shown) to be delivered to another electronic device 1003.

Figure 7E:
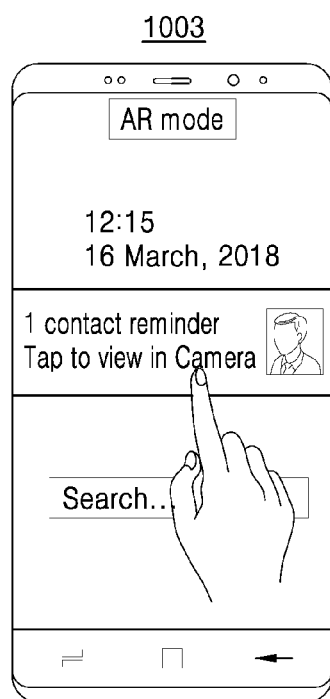
Figure 7F:
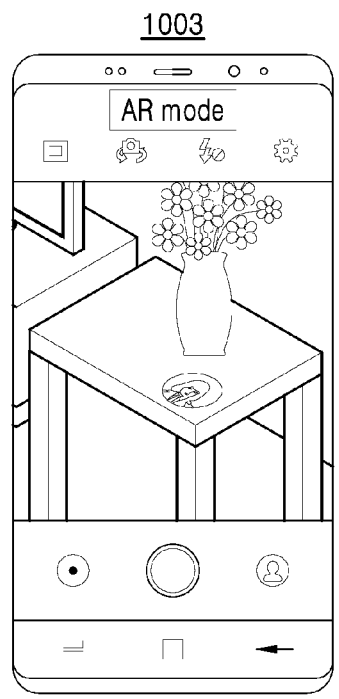
Figure 7G:
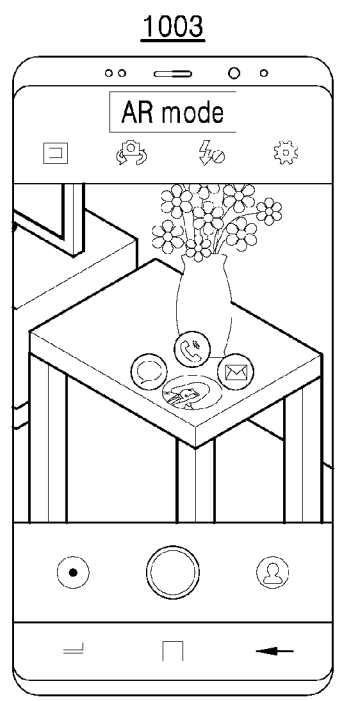
Figure 7H:
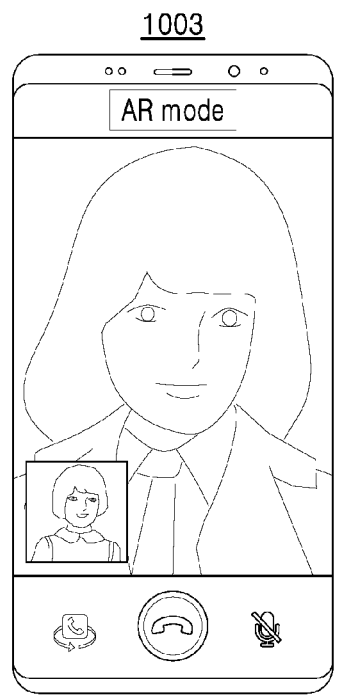

The other electronic device 1003 receives the digital artefact information in the form of a notification, when the other electronic device 1003 is in the vicinity of the transferred digital artefact as shown in FIG. 7E. Once the notification is accessed by the other electronic device 1003, the other electronic device 1003 retrieves the contact information by a tapping interaction on the other electronic device 1003, and provides a relevant application to perform the actions (e.g., launch the call with the contact based on the contact information) as shown in FIGS. 7F to 7H.

FIGS. 8A, 8B, 8C, 8D, 8E, and 8F are example illustrations in which a digital artefact is displayed on a user, by another user, according to various embodiments of the disclosure.

Figure 8A:
FIGS. 8A, 8B, 8C, 8D, 8E, and 8F are example illustrations in which a digital artefact is displayed on a user, by another user, according to various embodiments of the disclosure.
Figure 8B:
Figure 8C:
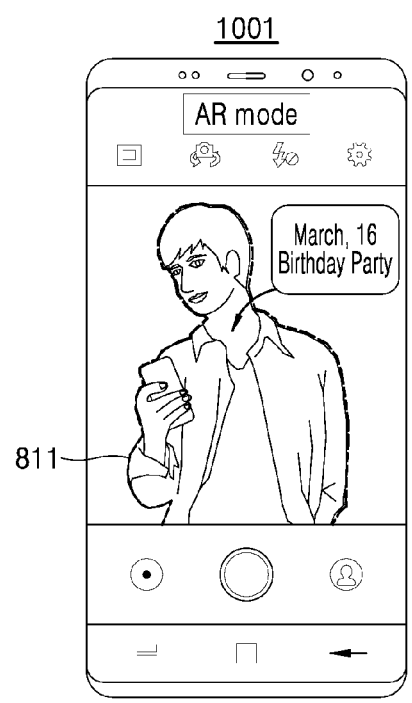
Figure 8D:
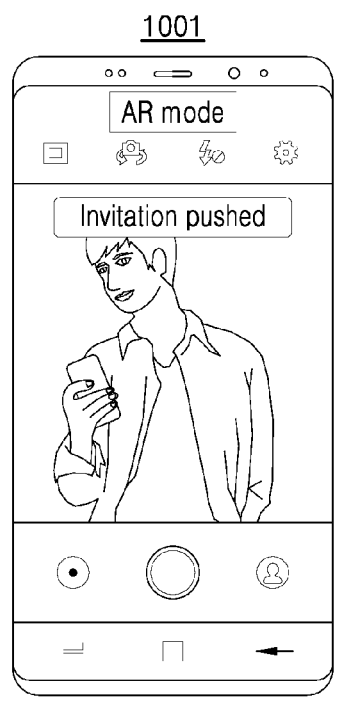

Referring to FIGS. 8A to 8F, the user (sender) of the electronic device 1001 performs a 3D-touch interaction on a calendar event 801 for a birthday party to invoke a calendar event on the camera. The calendar event 801 in the form of the digital artefact is generated and transmitted to another person in view by pointing the camera towards the other person 811 as shown in FIGS. 8C and 8D.

Figure 8E:
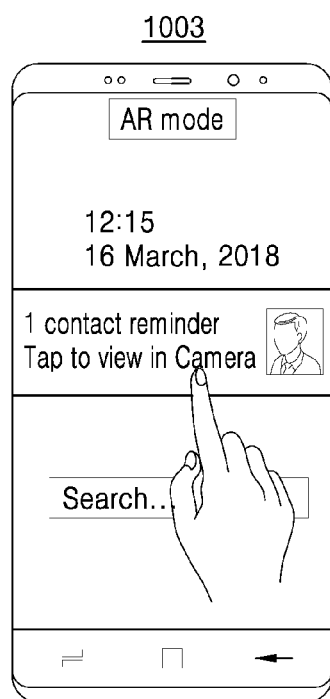
Figure 8F:

The other person 811 receives the notification of the digital artefact received from the user, and the other person 811 may access the calendar event 801 in a relevant application as shown in FIGS. 8E to 8F. Based on accessing the calendar event 801, the other person 811 may send the birthday wishes to the corresponding user.

In another example, when the user (sender) of the electronic device 1001 performs a 3D-touch interaction on the calendar event for a team lunch invitation to invoke the calendar event on the camera, the calendar event in the form of the digital artefact is created and transmitted to a group of people in view by pointing the camera towards them. The group of people receive the notification of the digital artefact, and the group of people may access the calendar event in a relevant application, and accordingly, can schedule the work activity.

FIGS. 9A, 9B, 9C, 9D, and 9E are example illustrations in which a digital artefact is displayed on a physical space according to various embodiments of the disclosure.

Figure 9A:
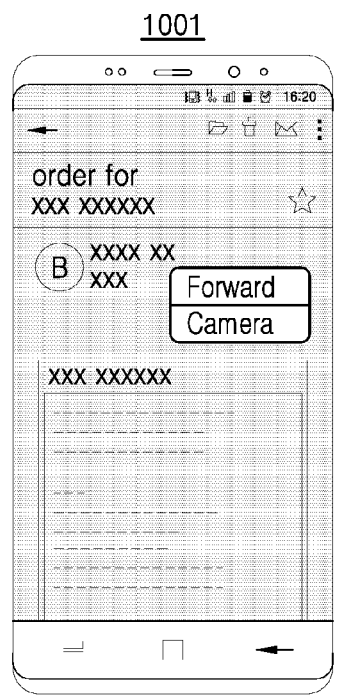
FIGS. 9A, 9B, 9C, 9D, and 9E are example illustrations in which a digital artefact is displayed on a physical space according to various embodiments of the disclosure.
Figure 9B:
Figure 9C:
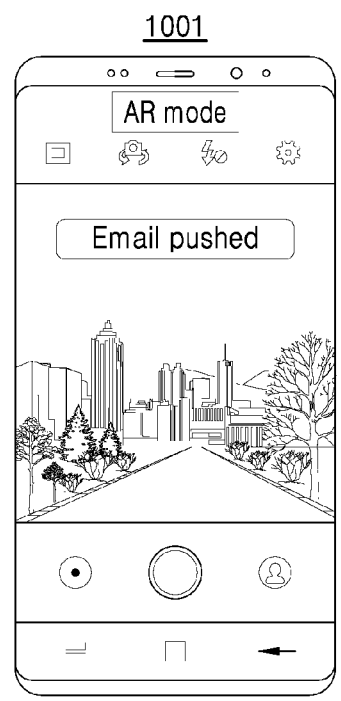
Figure 9D:
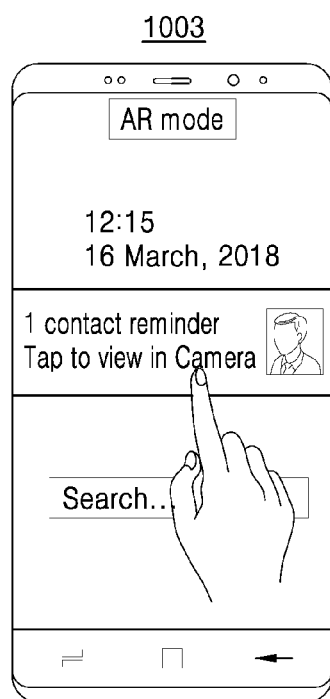
Figure 9E:
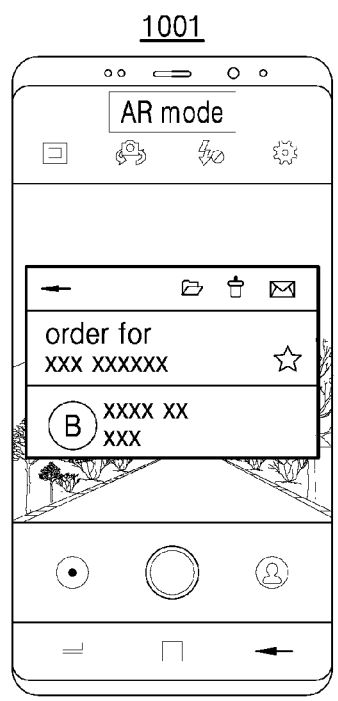

Referring to FIGS. 9A to 9E, the user (sender) of the electronic device 1001 performs a 3D-touch interaction on an email and invokes the camera to perform an action (e.g., setting a reminder, alerting about the building, or the like). After invoking the camera in the AR mode, the camera may detect a planar surface including an object corresponding to the building in the camera preview mode and the camera lists all detected planar surfaces. Further, once the user selects the planar surface from the detected planar surfaces, the user of the electronic device 1001 may push the digital artefact including an email and flattens the digital artefact on the planar surface to match the perspective of the physical object based on depth estimation, distance, direct calculations and/or GPS information of the object as shown in the FIGS. 9B and 9C. Referring to FIG. 9D, when the user is in the vicinity of the building, the device of the user may receive the notification of the digital artefact. Referring to FIG. 9E, the user may access the digital artefact in a relevant application and perform the relevant activity (e.g., enquire about the building, deliver a parcel to a person in the building, or the like).

In another example, the user (sender) of the electronic device 1001 performs a 3D-touch interaction on an email and invokes the camera to perform an action (e.g., setting a reminder, alerting about a landmark near a building, or the like). After invoking the camera in the AR mode, the camera detects a planar surface corresponding to the building in the camera preview mode and the camera lists all detected planar surfaces. Further, once the user selects the planar surface from the detected planar surfaces, the user of the electronic device 1001 may push the digital artefact including the email and modify the shape of the digital artefact on the planar surface to match the perspective of the physical object based on depth perception, distance, and direction calculations. Further, the digital artefact is shared with other users (e.g., residents and visitors). Another user receives the notification corresponding to the digital artefact. The other user may access the digital artefact in a relevant application, while he or she is near the location.

In another example, the email may be moved around in interior spaces of the building and edited for view sharing with residents and visitors.

FIGS. 10A, 10B, 10C, 10D, and 10E are example illustrations in which a digital artefact is displayed at an angle to be retrieved by a user at the same angle according to various embodiments of the disclosure.

Figure 10A:
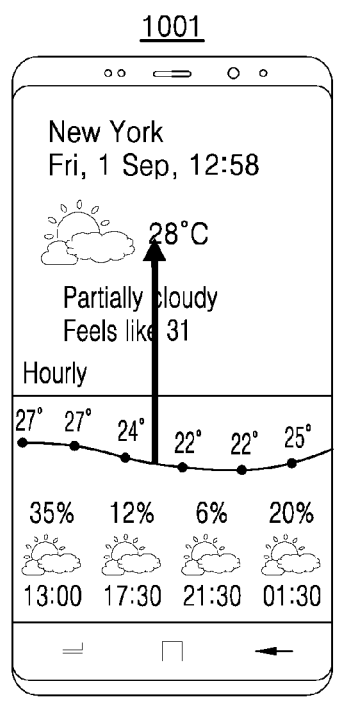
FIGS. 10A, 10B, 10C, 10D, and 10E are example illustrations in which a digital artefact is displayed at an angle to be retrieved by the user at the same angle according to various embodiments of the disclosure.
Figure 10B:
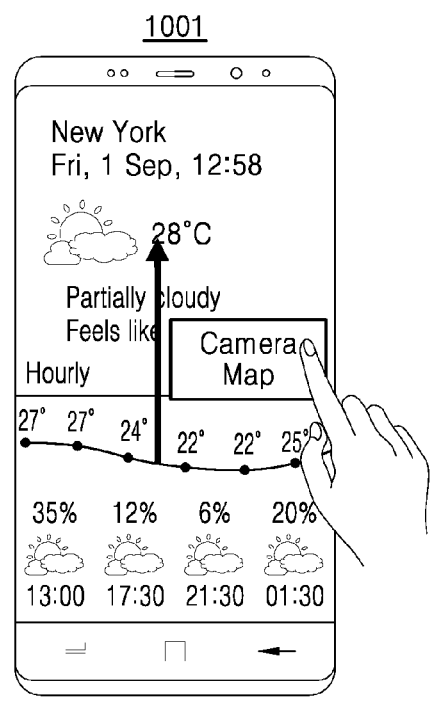
Figure 10C:
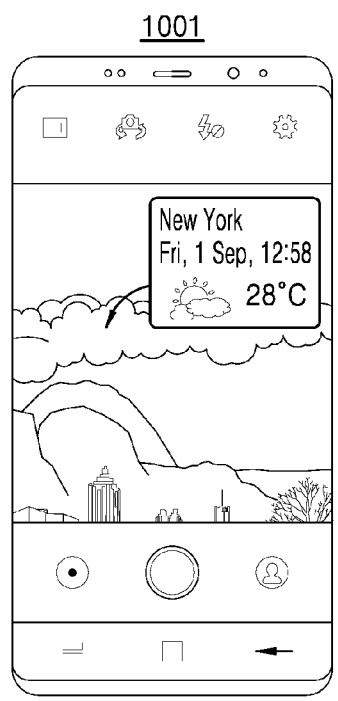
Figure 10D:
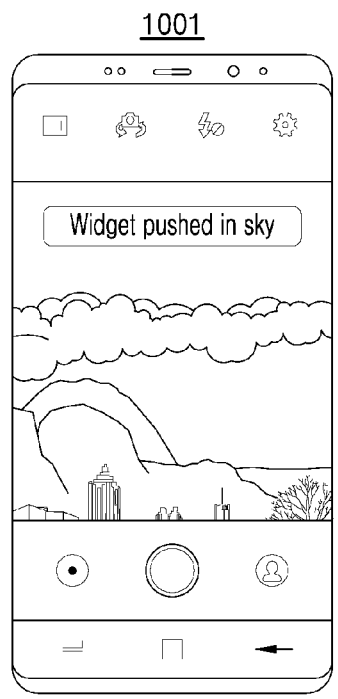

Referring to FIGS. 10A and 10B, when a touch interaction on a weather widget is performed to cast it onto the sky by the camera, the digital artefact transitions onto the sky and gets planted on the sky for rediscovery via the AR mode. The digital artefact is visible whenever the camera is pointed at the same angle or onto the same space as shown in FIGS. 10C and 10D. In other words, the digital artefact may be displayed on an image including an object such as sky when the camera points in the direction of the sky. The information associated with the digital artefact of the weather widget such as weather information may be displayed.

Figure 10E:
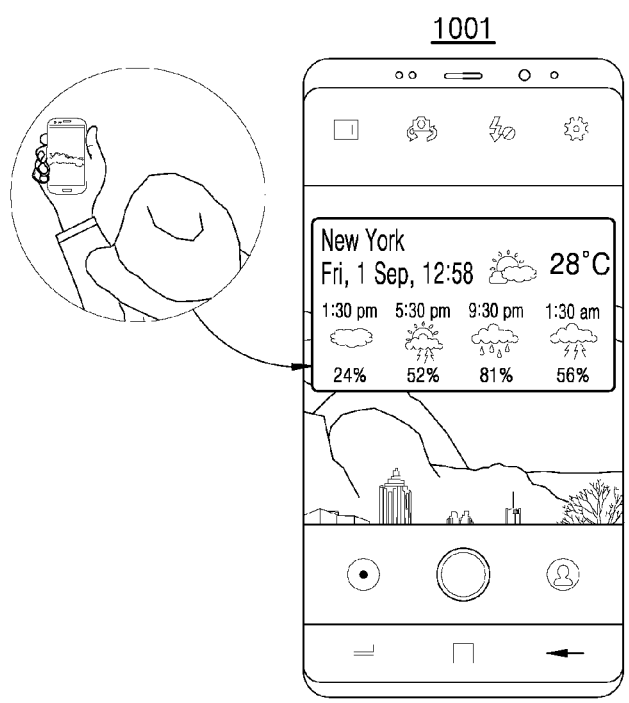

In an embodiment, once the weather widget is fixed to the sky, a dynamic weather forecast and updates can be visible whenever and wherever the camera is pointing at the sky, as shown in FIG. 10E.

FIGS. 11A, 11B, 11C, 11D, 11E, 11F, 11G, and 11H are example illustrations in which a digital artefact is displayed on a physical object or space to enable a continue viewing later option according to various embodiments of the disclosure.

Figure 11A:
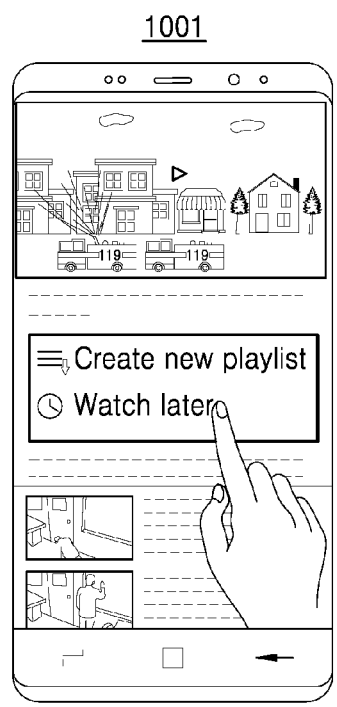
FIGS. 11A, 11B, 11C, 11D, 11E, 11F, 11G, and 11H are example illustrations in which a digital artefact is displayed on a physical object/space to enable a continue viewing later option according to various embodiments of the disclosure.
Figure 11B:
Figure 11C:
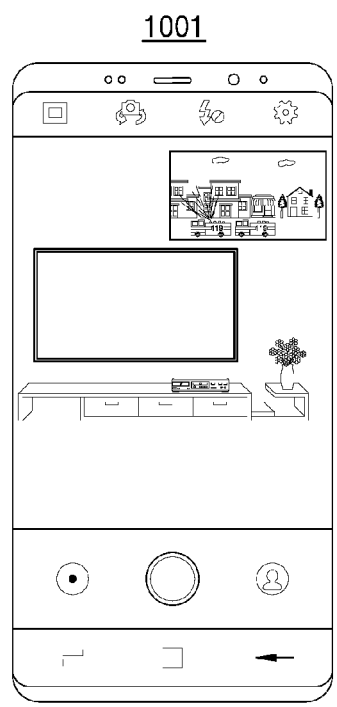
Figure 11D:
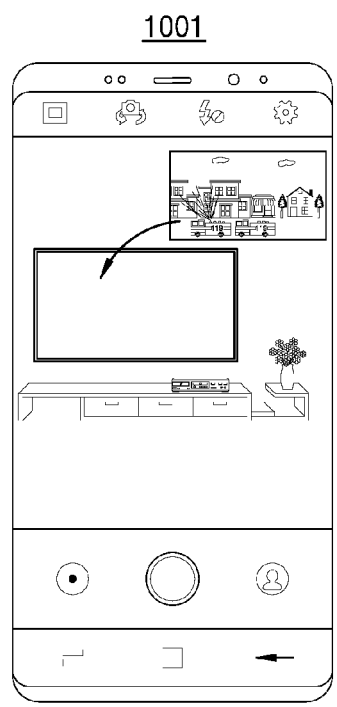
Figure 11E:
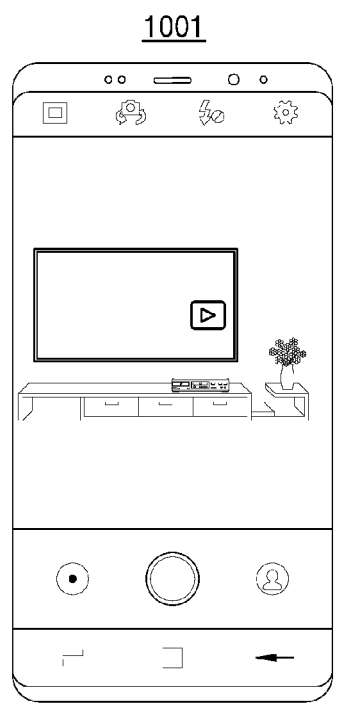
Figure 11F:
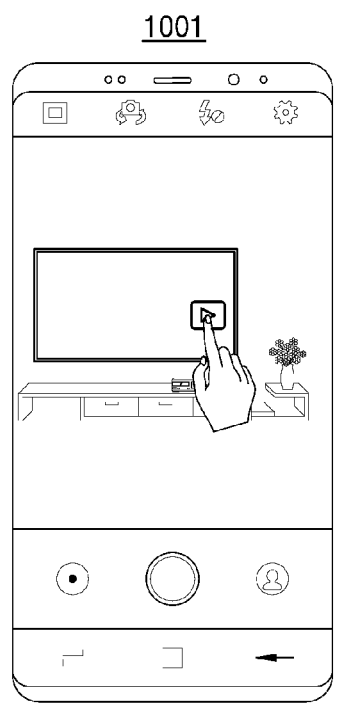
Figure 11G:
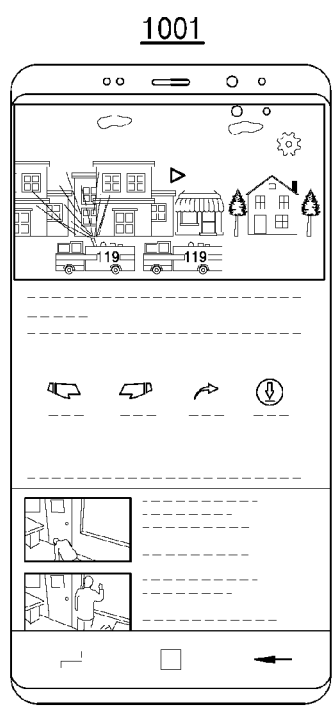
Figure 11H:
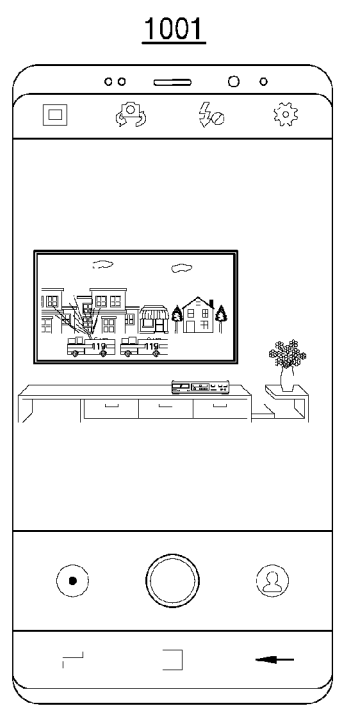
Figure 12A:
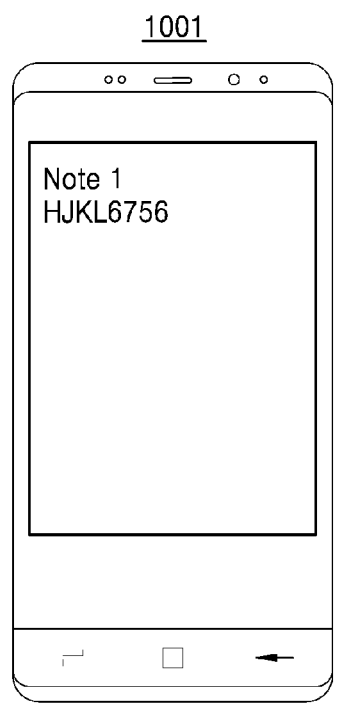
FIGS. 12A, 12B, 12C, 12D, 12E, 12F, 12G, and 12H are example illustrations in which a note with a password is displayed inside a locker space to be retrieved in a privacy mode according to various embodiments of the disclosure.
Figure 12B:
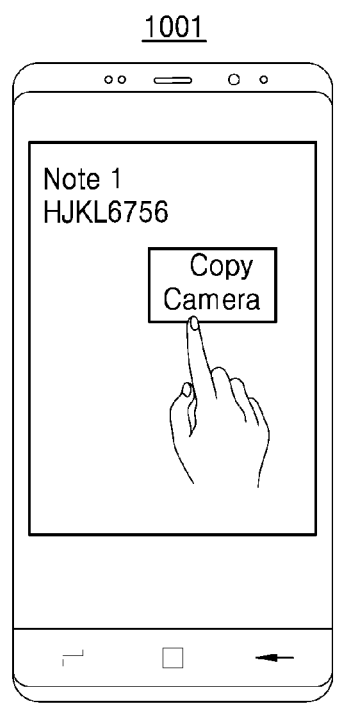
Figure 12C:
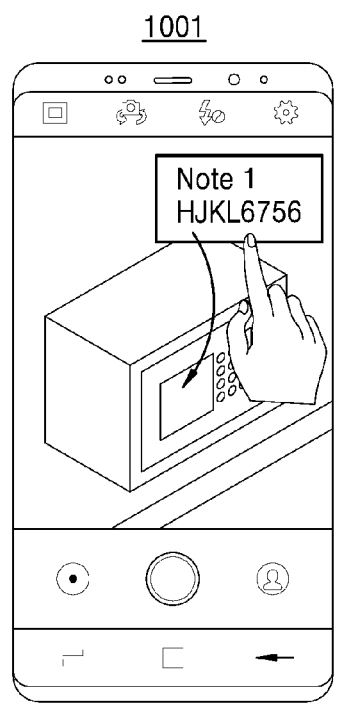
Figure 12D:
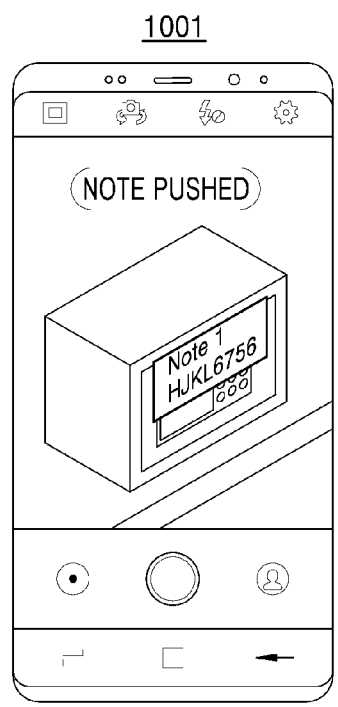
Figure 12E:
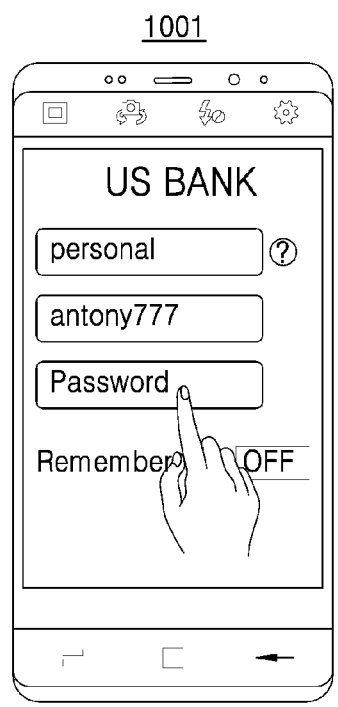
Figure 12F:
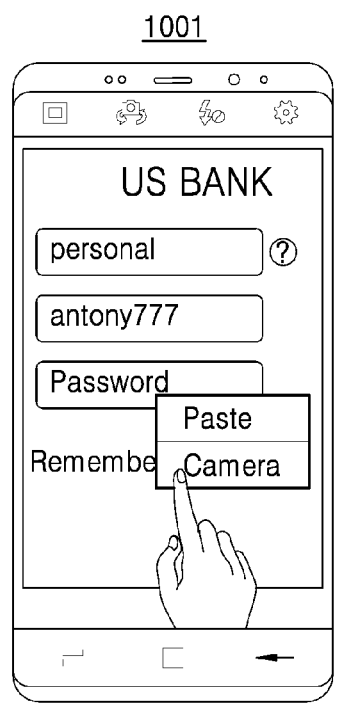
Figure 12G:
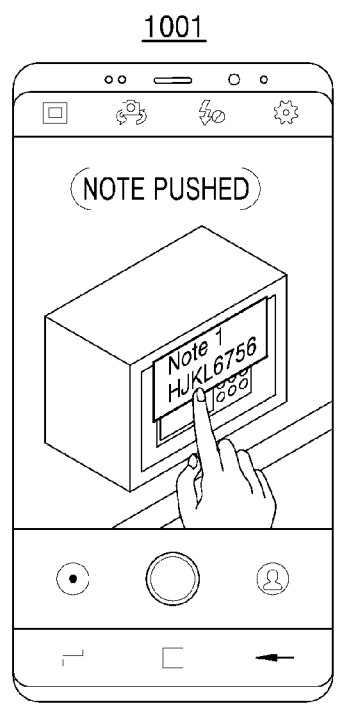
Figure 12H:

Referring to FIGS. 11A to 11C, when a video content being reproduced is displayed on the physical space by pointing the camera at a TV in a living room, the digital artefact including the video content transitions onto the surface and is flattened on the surface to match the perspective of the physical object or the surface as shown in FIGS. 11D and 11E. When the user returns home and is notified that the video content in the living room is paused and the video content reproduction is enabled, the user may retrieve the notification in the AR mode and watch the video content reproduced on the same device or on another device such as a TV as shown in FIGS. 11F to 11H.

FIGS. 12A, 12B, 12C, 12D, 12E, 12F, 12G, and 12H are example illustrations in which a note with a password is displayed on a locker captured by a camera to be retrieved in a privacy mode according to various embodiments of the disclosure.

Referring to FIGS. 12A to 12D, when the note with the password is displayed on a secret space (e.g., a locker) by pointing the camera at the secret space, the security information such as password may transition onto the surface and is flattened on it to match the perspective of the secret space. The password is retrieved using a UI to invoke the camera through the UI, and the password is fetched from the secret space through the AR mode, as shown in FIGS. 12E to 12H.

FIGS. 13A, 13B, 13C, 13D, 13E, 13F, and 13G are example illustrations in which multiple bills are pushed into a common box to manage expenses according to various embodiments of the disclosure.

Figure 13A:
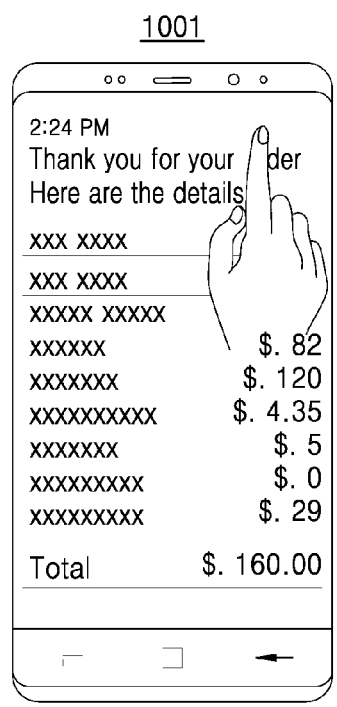
FIGS. 13A, 13B, 13C, 13D, 13E, 13F, and 13G are example illustrations in which multiple bills are displayed on a common box to manage expenses according to various embodiments of the disclosure.
Figure 13B:
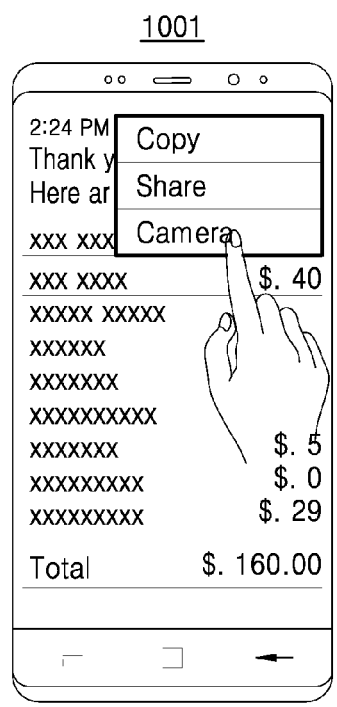
Figure 13C:
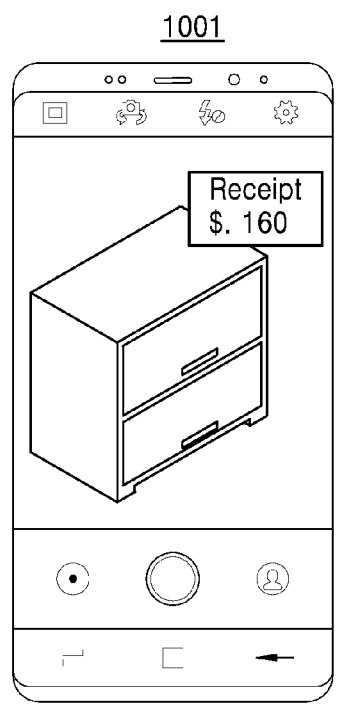
Figure 13D:
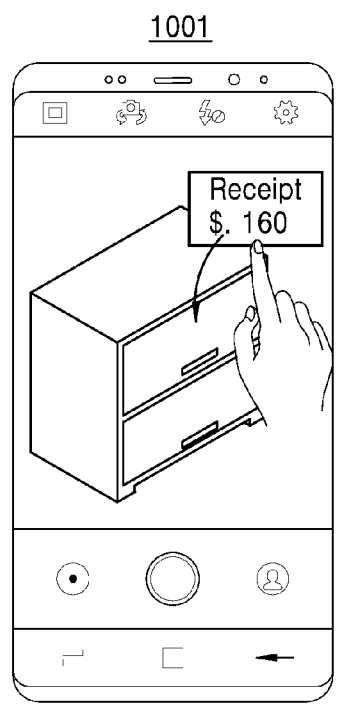
Figure 13E:
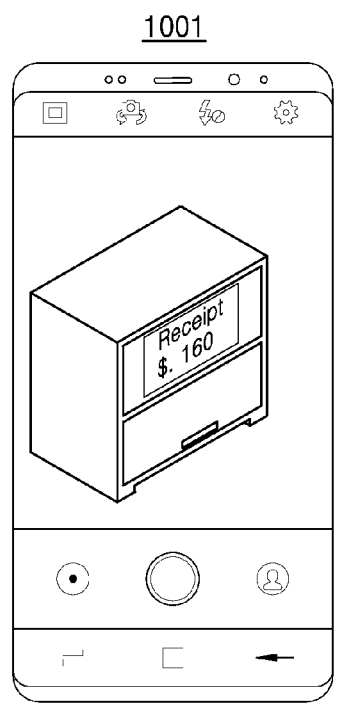

Referring to FIGS. 13A to 13D, when a 3D-touch interaction is performed on price or cost information including bills/receipts, and the multiple bills/receipts are displayed in the common space (e.g., box) by pointing the camera at the box. The bill amounts get added in the background and various calculations/statistics (e.g., monthly expenditure tracking and money management advice) can be retrieved from the box by pointing the camera at the box, as shown in FIG. 13E.

Figure 13F:
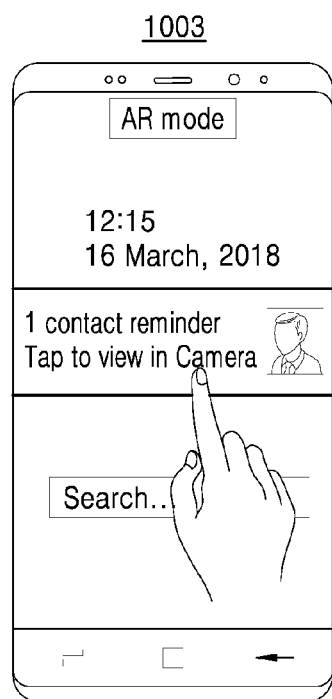
Figure 13G:
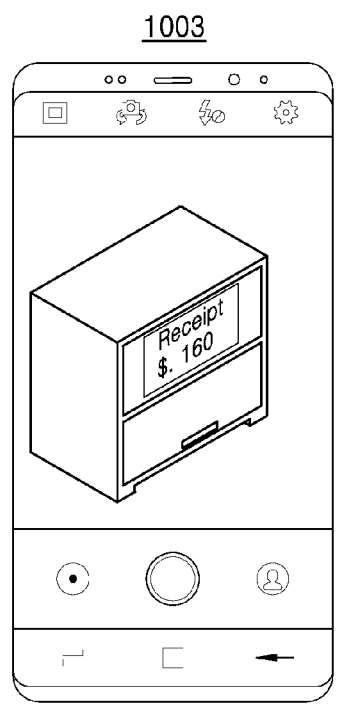

The notification about the monthly expenditure tracking and the money management advice is pushed to the user's electronic device 1003 when the electronic device is in the vicinity of the pushed item such as the box and when an update to the expenditure is available, as shown in FIG. 13F. The user can track his or her expenses by pointing the camera at the box through the AR mode as shown in FIG. 13G.

FIGS. 14A, 14B, 14C, 14D, 14E, 14F, 14G, and 14H are example illustrations in which a shared itinerary is displayed on a physical space to be accessed by multiple users according to various embodiments of the disclosure.

Figure 14A:
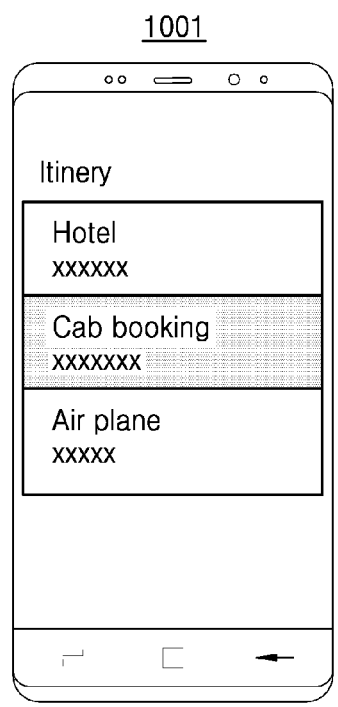
FIGS. 14A, 14B, 14C, 14D, 14E, 14F, 14G, and 14H are example illustrations in which a shared itinerary is displayed on a physical space to be accessed by multiple users according to various embodiments of the disclosure.
Figure 14B:
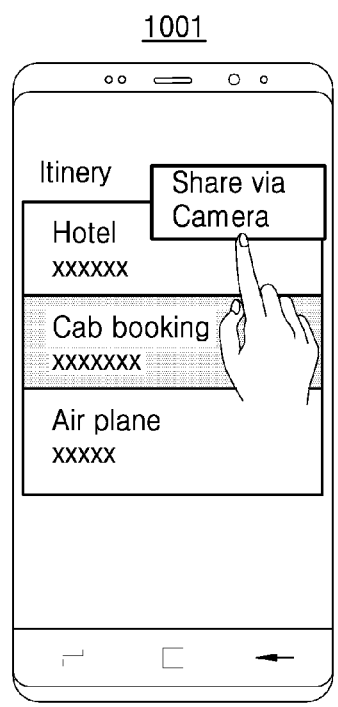
Figure 14C:
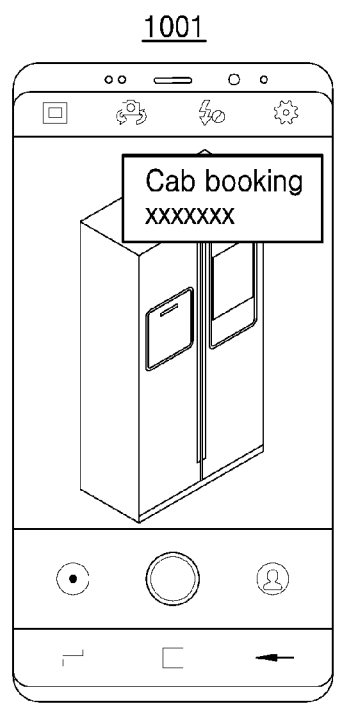
Figure 14D:
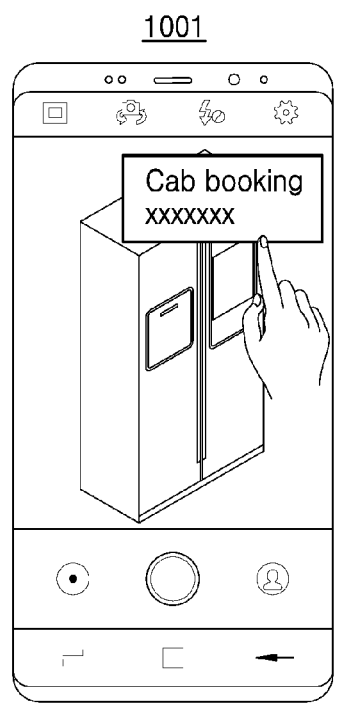

Referring to FIGS. 14A and 14B, when a 3D-touch interaction is performed on the shared itinerary, the shared itinerary (e.g., a travel plan itinerary or the like) is displayed on a common space (e.g., a refrigerator or the like) by pointing the camera at the common space, as shown in FIGS. 14C and 14D.

Figure 14E:
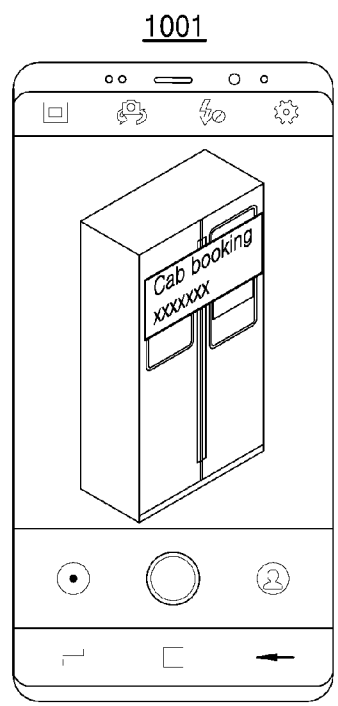
Figure 14F:
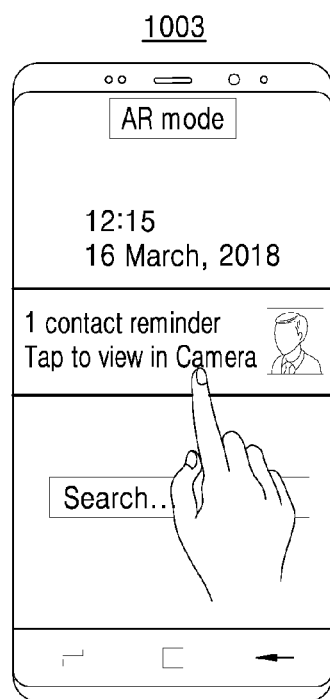
Figure 14G:
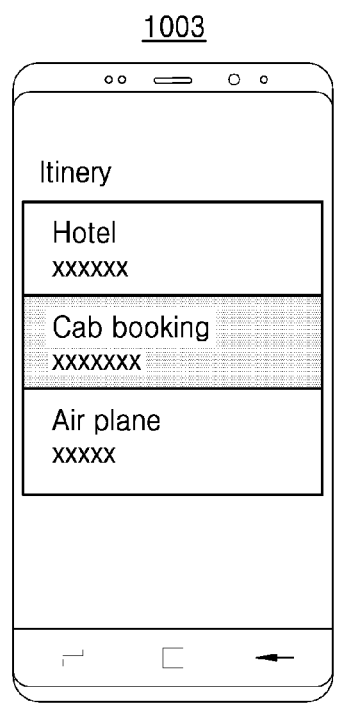
Figure 14H:
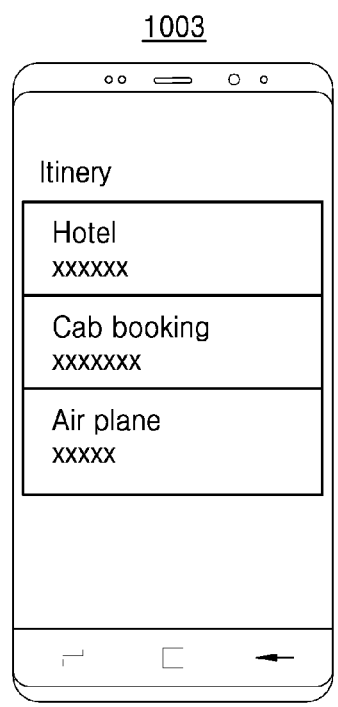
Figure 15A:
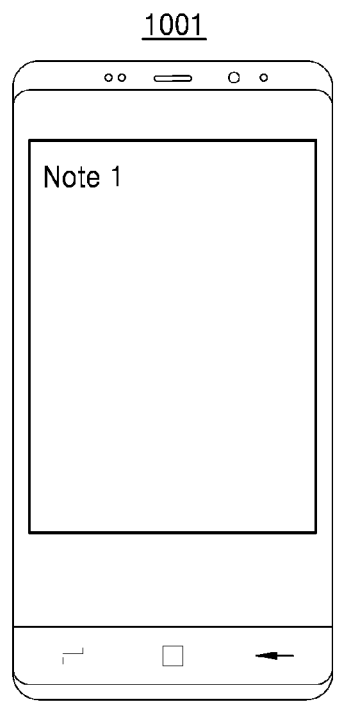
FIGS. 15A, 15B, 15C, 15D, 15E, 15F, 15G, and 15H are example illustrations in which the digital artefact is displayed on a physical object to be retrieved by another image capturing device according to various embodiments of the disclosure.
Figure 15B:
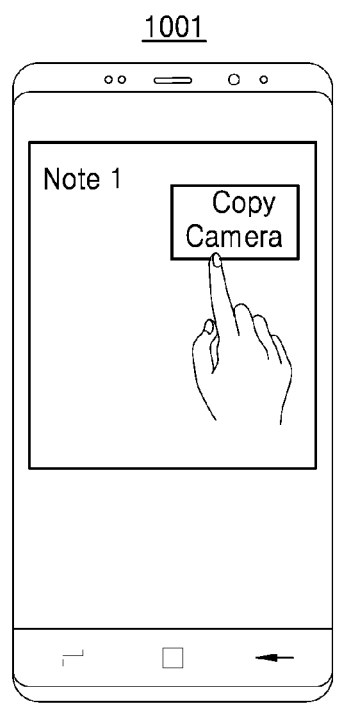
Figure 15C:
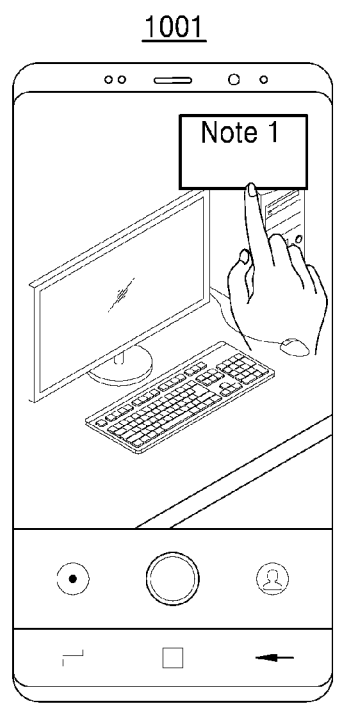
Figure 15D:
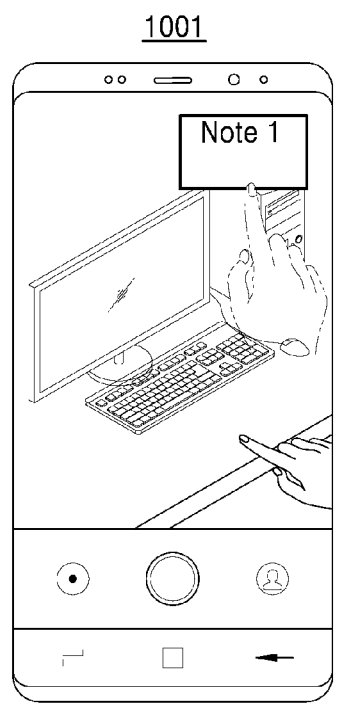
Figure 15E:
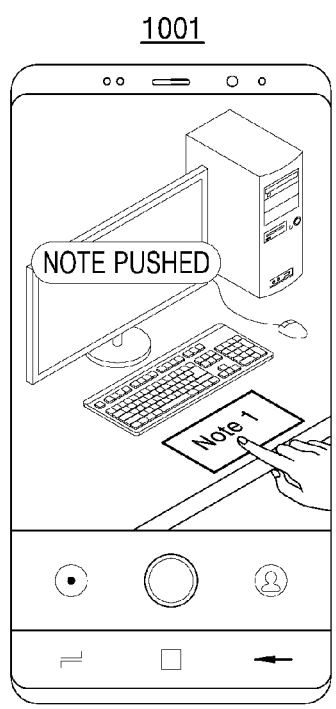
Figure 15F:
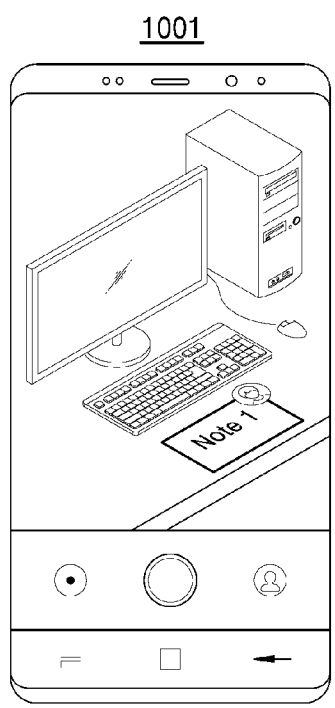
Figure 15G:
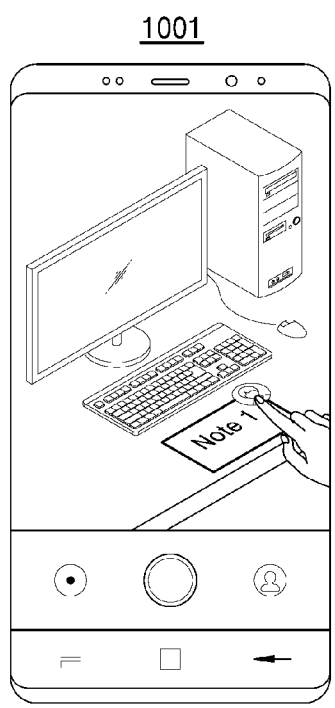
Figure 15H:
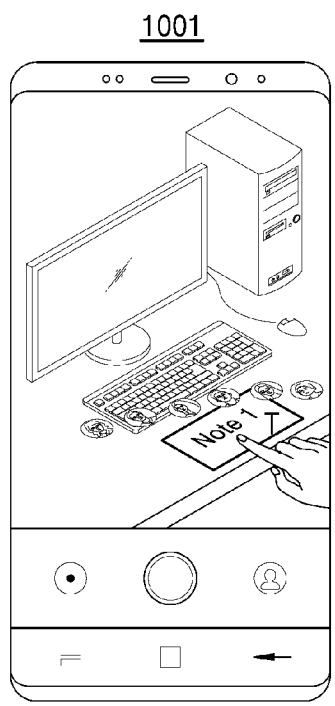

The notification is pushed to itinerary sharing contacts when the user is in the vicinity of the pushed item, and when any user-specific update has been set by others, or is waiting to be viewed, as shown in FIGS. 14E and 14F. A different UI is seen by each of the sharing contacts, based on items appended thereon, when respective cameras are pointed at the shared space.

FIGS. 15A, 15B, 15C, 15D, 15E, 15F, 15G, and 15H are example illustrations in which a digital artefact is displayed on a physical object to be retrieved by another image capturing device according to various embodiments of the disclosure.

Referring to FIG. 15A to 15D, a note is displayed on a physical space (e.g., a colleague's desk) by pointing the camera at the physical space. When the colleague returns to his or her desk and discovers the note left there using his or her camera, the colleague is also notified based on coordinates of the desk/work space that the user has left the note there for the colleague, as shown in FIGS. 15E to 15H. Further, the colleague can perform an action as required.

The example embodiments disclosed herein may be implemented using at least one software program running on at least one hardware device and performing network management functions to control the elements.

The example embodiments herein have been described with reference to specific example embodiments; however, it will be evident that various modifications and changes may be made to these example embodiments without departing from the broader spirit and scope of the various example embodiments. It is to be also understood that the phraseology or terminology employed herein is for the purpose of description and not of limitation. Therefore, while the embodiments herein have been described in terms of example embodiments, those of ordinary skill in the art will recognize that the example embodiments herein can be practiced with modification within the spirit and scope of the claims as described herein.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method of managing content in an augmented reality (AR) system, the method comprising:
identifying a digital artefact that is used by a first application of an electronic device;
executing an image capturing application to capture images;
displaying the digital artefact on at least one captured image on a screen;
determining that the digital artefact contains financial information;
generating a summary of the financial information based on the digital artefact and at least one other digital artefact displayed in a common space; and
displaying the summary of the financial information on the at least one other digital artefact.

2. The method of claim 1, further comprising:
selecting a contact by pointing a camera of the electronic device at a person associated with the contact; and
while the digital artefact is displayed, receiving a user input on the digital artefact for performing an action of transmitting a notification associated with the digital artefact to a second electronic device of the selected contact when the contact is selected by pointing the camera,
wherein the performing of the action comprises:
sharing the digital artefact with the selected contact via an augmented reality (AR) view application.

3. The method of claim 2,
wherein the performing the action comprises sharing the digital artefact with the second electronic device of the selected contact.

4. The method of claim 2, further comprising:
while the digital artefact is displayed on the screen, selecting the digital artefact; and
superimposing the digital artefact on an object.

5. The method of claim 4, further comprising:
determining whether the second electronic device is located in a vicinity of the object based on at least one of a depth estimation of the object on the screen or global positioning system (GPS) information of the object.

6. The method of claim 4, wherein the transmitting of the notification to the second electronic device is performed when the second electronic device points at the object.

7. The method of claim 6, wherein the digital artefact comprises price information of the object.

8. The method of claim 2,
wherein the digital artefact is displayed when the electronic device points in a first direction, and
wherein the performing of the action comprises displaying information associated with the digital artefact when the electronic device points in the first direction.

9. The method of claim 1, further comprising:
superimposing the digital artefact on an object,
wherein the identifying of the digital artefact comprises detecting digital content that is displayed by the first application, and
wherein the object comprises a content renderer for rendering the digital content.

10. The method of claim 9, further comprising:
performing, in response to a user input, an action of reproducing the digital content on the content renderer.

11. The method of claim 10, wherein the reproducing of the digital content on the content renderer comprises, when an input for pausing the displaying of the digital artefact is received, resuming the displaying of the digital content.

12. The method of claim 10, wherein the displaying of the digital artefact comprises identifying the object based on at least one of global positioning system (GPS) information or a depth estimation of the object on the screen.

13. The method of claim 10, wherein the performing of the action further comprises controlling the content renderer to be powered on for reproducing the digital content.

14. The method of claim 1,
wherein the digital artefact is superimposed on an object, and
wherein the digital artefact is associated with security information and the object is unlocked or logged-in with the security information.

15. An apparatus for managing content in an augmented reality (AR) system, the apparatus comprising:
a display;
an image capturing device; and
a processor configured to:
identify a digital artefact used by a first application,
execute an image capturing application to capture images,
control to display, on the display, the digital artefact on at least one captured image,
determine that the digital artefact contains financial information;
generate a summary of the financial information based on the digital artefact and at least one other digital artefact displayed in a common space; and
control to display, on the display, the summary of the financial information on the at least one other digital artefact.

16. The apparatus of claim 15, wherein the processor is further configured to:
identify an object disposed in a screen of the display,
identify content associated with the object, and
in response to a user input, display the content superimposed over the object.

17. The apparatus of claim 16, wherein the content comprises private information of a user.

18. The apparatus of claim 17, wherein the processor is further configured to:
display the private information using the first application, and
receive an input in the first application to bind the private information to the image capturing application.

19. The apparatus of claim 15, wherein the digital artefact comprises a widget displaying dynamically updating data.

20. The apparatus of claim 15, wherein the processor is further configured to:
control to display, on the display, the digital artefact when the image capturing device is pointed at a recognized outdoor space.

21. The apparatus of claim 15, wherein the digital artefact is displayed independently of a display of an object of a real world when the image capturing device is pointed substantially at a specified angle, the digital artefact being displayed based on the specified angle and independent of a particular field of view (FOV) of the image capturing device.

22. The apparatus of claim 15, wherein the digital artefact comprises one of a bill or a receipt.

23. The apparatus of claim 15, wherein the summary of the financial information comprises monthly expenditure tracking.

24. The apparatus of claim 15, wherein the summary of the financial information comprises money management advice.

* * * * *